(12) United States Patent
Sasaki et al.

(10) Patent No.: US 8,274,759 B1
(45) Date of Patent: Sep. 25, 2012

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Atsushi Iijima, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/304,975

(22) Filed: Nov. 28, 2011

(51) Int. Cl.
*G11B 5/127* (2006.01)
(52) U.S. Cl. .............................. 360/125.13; 360/125.15
(58) Field of Classification Search ............ 360/125.09, 360/125.1, 125.11, 125.13, 125.14, 125.15
See application file for complete search history.

(56) References Cited

U.S. PATENT DOCUMENTS

| | | | | |
|---|---|---|---|---|
| 7,343,668 B2 * | 3/2008 | Kobayashi | ................. | 29/603.16 |
| 7,443,633 B2 * | 10/2008 | Tagami et al. | ............. | 360/125.5 |
| 8,201,320 B2 * | 6/2012 | Allen et al. | ................ | 29/603.16 |
| 2004/0150910 A1 | 8/2004 | Okada et al. | | |
| 2008/0024911 A1 * | 1/2008 | Sasaki et al. | ................... | 360/110 |
| 2008/0297953 A1 * | 12/2008 | Matono et al. | ................ | 360/319 |
| 2009/0059426 A1 | 3/2009 | Sasaki et al. | | |
| 2009/0141406 A1 * | 6/2009 | Sasaki et al. | ................... | 360/319 |

* cited by examiner

Primary Examiner — Brian Miller
(74) Attorney, Agent, or Firm — Oliff & Berridge, PLC

(57) ABSTRACT

A main pole has a top surface including a first portion and a second portion. The main pole has a bottom end including a third portion and a fourth portion. Each of the first and third portions has a first end located in a medium facing surface. The first portion is inclined relative to the medium facing surface and a first virtual plane that passes through the first end and is perpendicular to the medium facing surface and to the direction of travel of a recording medium. The third portion is inclined relative to the medium facing surface and a second virtual plane that passes through the first end and is perpendicular to the medium facing surface and to the direction of travel of the recording medium. The first portion is smaller than the third portion in length in a direction perpendicular to the medium facing surface.

7 Claims, 25 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

A known technique for preventing adjacent track erasure induced by a skew is to configure the main pole so that its end face located in the medium facing surface decreases in width with increasing proximity to the top surface of the substrate, as disclosed in U.S. Patent Application Publication Nos. US 2004/0150910 A1 and US 2009/0059426 A1, for example. U.S. Patent Application Publication Nos. US 2004/0150910 A1 and US 2009/0059426 A1 also disclose configuring the main pole so that its thickness in the vicinity of the medium facing surface decreases with increasing proximity to the medium facing surface.

In order to prevent skew-induced problems, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to direct much magnetic flux to the medium facing surface, thus leading to degradation of overwrite property.

Configuring the main pole so that its thickness in the vicinity of the medium facing surface decreases with increasing proximity to the medium facing surface as disclosed in U.S. Patent Application Publication Nos. US 2004/0150910 A1 and US 2009/0059426 A1 makes it possible to reduce the thickness of the main pole in the medium facing surface and increase the thickness of a portion of the main pole away from the medium facing surface to allow the main pole to direct much magnetic flux to the medium facing surface.

In order to prevent adjacent track erasure induced by a skew and provide higher recording densities, it is effective to provide a write shield that has an end face located in the medium facing surface at a position forward of the end face of the main pole in the direction of travel of the recording medium, as disclosed in U.S. Patent Application Publication No. US 2009/0059426 A1.

In a magnetic head having the write shield, there are typically provided one or more return path sections for connecting the write shield to part of the main pole away from the medium facing surface. The write shield and the one or more return path sections function to capture a magnetic flux that is produced from the end face of the main pole and spreads in directions other than the direction perpendicular to the plane of the recording medium, and to thereby prevent the magnetic flux from reaching the recording medium. The write shield and the one or more return path sections also function to allow a magnetic flux that has been produced from the end face of the main pole and has magnetized the recording medium to flow back to the main pole.

The position of an end of a record bit to be recorded on the recording medium depends on the position of an end of the end face of the main pole located in the medium facing surface, the end being located forward in the direction of travel of the recording medium. In order to define the position of the end of the record bit accurately, it is therefore important that the write shield have an end face that is located in the medium facing surface at a position forward of the end face of the main pole in the direction of travel of the recording medium and that this end face of the write shield capture a magnetic flux that is produced from the end face of the main pole and spreads in directions other than the direction perpendicular to the plane of the recording medium. The magnetic head having the write shield is capable of preventing adjacent track erasure and provides a further improved recording density.

In view of the foregoing, in order to prevent adjacent track erasure induced by a skew and provide a higher recording density, a magnetic head may be so configured that part of the top surface of the main pole in the vicinity of the medium facing surface is formed into a first slope that is inclined relative to a direction perpendicular to the medium facing surface, and a write shield is provided with a second slope opposed to the first slope of the main pole, as disclosed in U.S. Patent Application Publication No. US 2009/0059426 A1.

The above-described configuration, however, has a problem in that where the first slope of the main pole and the second slope of the write shield are opposed to each other over a large area with a small spacing between the first and second slopes, a large amount of magnetic flux leaks from the main pole to the write shield to cause degradation of write characteristics such as the overwrite property. To avoid this, at least one of the first and second slopes may be reduced in length in the direction perpendicular to the medium facing surface.

Reducing the first slope in length in the direction perpendicular to the medium facing surface, however, precludes a sufficient increase in the thickness of a portion of the main pole that is located farther from the medium facing surface than is the first slope. This makes the main pole unable to direct much magnetic flux to the medium facing surface, and thus leads to degradation of write characteristics such as the overwrite property.

On the other hand, reducing the second slope in length in the direction perpendicular to the medium facing surface causes a decrease in the volume of a portion of the write shield that is located forward of the main pole in the direction of travel of the recording medium, thereby compromising the function of the write shield. More specifically, a reduction in the volume of the aforementioned portion of the write shield is likely to cause the saturation of magnetic flux in this portion. This in turn causes magnetic flux leakage from this portion toward the medium facing surface, raising a problem that the magnetic flux leakage may result in accidental erasure of data stored on the recording medium.

It has thus been difficult for a conventional magnetic head including a write shield to prevent the skew-induced problems and provide improved write characteristics without compromising the function of the write shield.

OBJECT AND SUMMARY OF THE INVENTION

It is an object of the present invention to provide a magnetic head for perpendicular magnetic recording that is capable of preventing the skew-induced problems and providing improved write characteristics without compromising the function of the write shield.

A magnetic head for perpendicular magnetic recording of the present invention includes: a medium facing surface that faces a recording medium; a coil that produces a magnetic field corresponding to data to be written on the recording medium; a main pole; a write shield; and a gap part. The main pole has an end face located in the medium facing surface, allows a magnetic flux corresponding to the magnetic field produced by the coil to pass, and produces a write magnetic field for writing the data on the recording medium by means of a perpendicular magnetic recording system. The write shield is made of a magnetic material and has an end face located in the medium facing surface. The gap part is made of a nonmagnetic material and interposed between the main pole and the write shield.

The end face of the write shield includes a first end face portion that is located forward of the end face of the main pole in a direction of travel of the recording medium. The main pole has a top surface, and a bottom end opposite to the top surface, the top surface being a surface located at a forward end in the direction of travel of the recording medium. The top surface of the main pole includes a first portion and a second portion that are arranged in this order of increasing distance from the medium facing surface. The first portion has a first end located in the medium facing surface, and a second end opposite to the first end. The bottom end of the main pole includes a third portion and a fourth portion that are arranged in this order of increasing distance from the medium facing surface. The third portion has a first end located in the medium facing surface, and a second end opposite to the first end.

The present invention assumes a first virtual plane and a second virtual plane. The first virtual plane passes through the first end of the first portion and is perpendicular to the medium facing surface and to the direction of travel of the recording medium, while the second virtual plane passes through the first end of the third portion and is perpendicular to the medium facing surface and to the direction of travel of the recording medium. The first portion is inclined relative to the first virtual plane and the medium facing surface such that the second end of the first portion is located forward of the first virtual plane in the direction of travel of the recording medium. The third portion is inclined relative to the second virtual plane and the medium facing surface such that the second end of the third portion is located backward of the second virtual plane in the direction of travel of the recording medium. The second portion and the fourth portion extend in a direction substantially perpendicular to the medium facing surface. The write shield has a first slope including a portion that is opposed to the first portion with the gap part interposed therebetween. The first slope is inclined relative to the first virtual plane and the medium facing surface.

The distance between the fourth portion and the second virtual plane is greater than that between the second portion and the first virtual plane. The first portion is smaller than each of the third portion and the first slope in length in a direction perpendicular to the medium facing surface.

In the magnetic head for perpendicular magnetic recording of the present invention, the write shield may have a second slope that is opposed to the third portion with the gap part interposed therebetween. The second slope is inclined relative to the second virtual plane and the medium facing surface. The second slope is smaller than the third portion in length in the direction perpendicular to the medium facing surface.

The write shield may include a first shield that is located forward of the main pole in the direction of travel of the recording medium, and a second shield that is located backward of the main pole in the direction of travel of the recording medium. The first shield includes the first end face portion and the first slope. The second shield includes a second end face portion and the second slope, the second end face portion being located backward of the end face of the main pole in the direction of travel of the recording medium. The magnetic head for perpendicular magnetic recording may further include a nonmagnetic layer disposed around the second shield. The nonmagnetic layer includes a slope that is continuous with the second slope and inclined relative to the second virtual plane and the medium facing surface. In this case, the third portion is opposed to the slope of the nonmagnetic layer and the second slope with the gap part interposed between the third portion and each of the slope of the nonmagnetic layer and the second slope. The nonmagnetic layer may be formed of a material having a Vickers hardness lower than that of alumina.

In the magnetic head for perpendicular magnetic recording of the present invention, the end face of the main pole located in the medium facing surface may have a width that decreases with increasing proximity to the second virtual plane.

In the magnetic head for perpendicular magnetic recording of the present invention, the end face of the write shield may further include a second, a third, and a fourth end face portion. The second end face portion is located backward of the end face of the main pole in the direction of travel of the recording medium. The third and fourth end face portions are located on opposite sides of the end face of the main pole in a track width direction. In this case, the magnetic head for perpendicular magnetic recording may further include a first return path section and a second return path section each made of a magnetic material. The first return path section is located forward of the main pole in the direction of travel of the recording medium and connects the write shield and part of the main pole away from the medium facing surface to each other so that a first space is defined by the main pole, the gap part, the write shield, and the first return path section. The second return path section is located backward of the main pole in the direction of travel of the recording medium and connects the write shield and part of the main pole away from the medium facing surface to each other so that a second space is defined by the main pole, the gap part, the write shield, and the second return path section. The coil includes a first portion passing through the first space and a second portion passing through the second space.

In the magnetic head for perpendicular magnetic recording of the present invention, the first portion of the top surface of the main pole is smaller than the first slope of the write shield in length in the direction perpendicular to the medium facing surface. According to the present invention, this allows the first portion and the first slope to be opposed to each other over a smaller area, thereby allowing prevention of magnetic flux leakage from the main pole to the write shield without compromising the function of the write shield. Furthermore, in the present invention, the distance between the fourth portion and the second virtual plane is greater than the distance between the second portion and the first virtual plane, and the first portion is smaller than the third portion in length in the direction perpendicular to the medium facing surface. The present invention thus allows the main pole to have a small thickness in the medium facing surface and to have a sufficiently large thickness in a portion thereof that is located farther from the medium facing surface than is the third portion. This makes it possible to prevent the skew-induced problems and to provide improved write characteristics, while preventing magnetic flux leakage from the main pole to the write shield as described above. Consequently, according to the present invention, it is possible to prevent the skew-induced problems and to provide improved write characteristics without compromising the function of the write shield.

Other objects, features and advantages of the present invention will become fully apparent from the following description.

DETAILED DESCRIPTION OF THE PREFERRED EMBODIMENTS

First Embodiment

Figure 1:
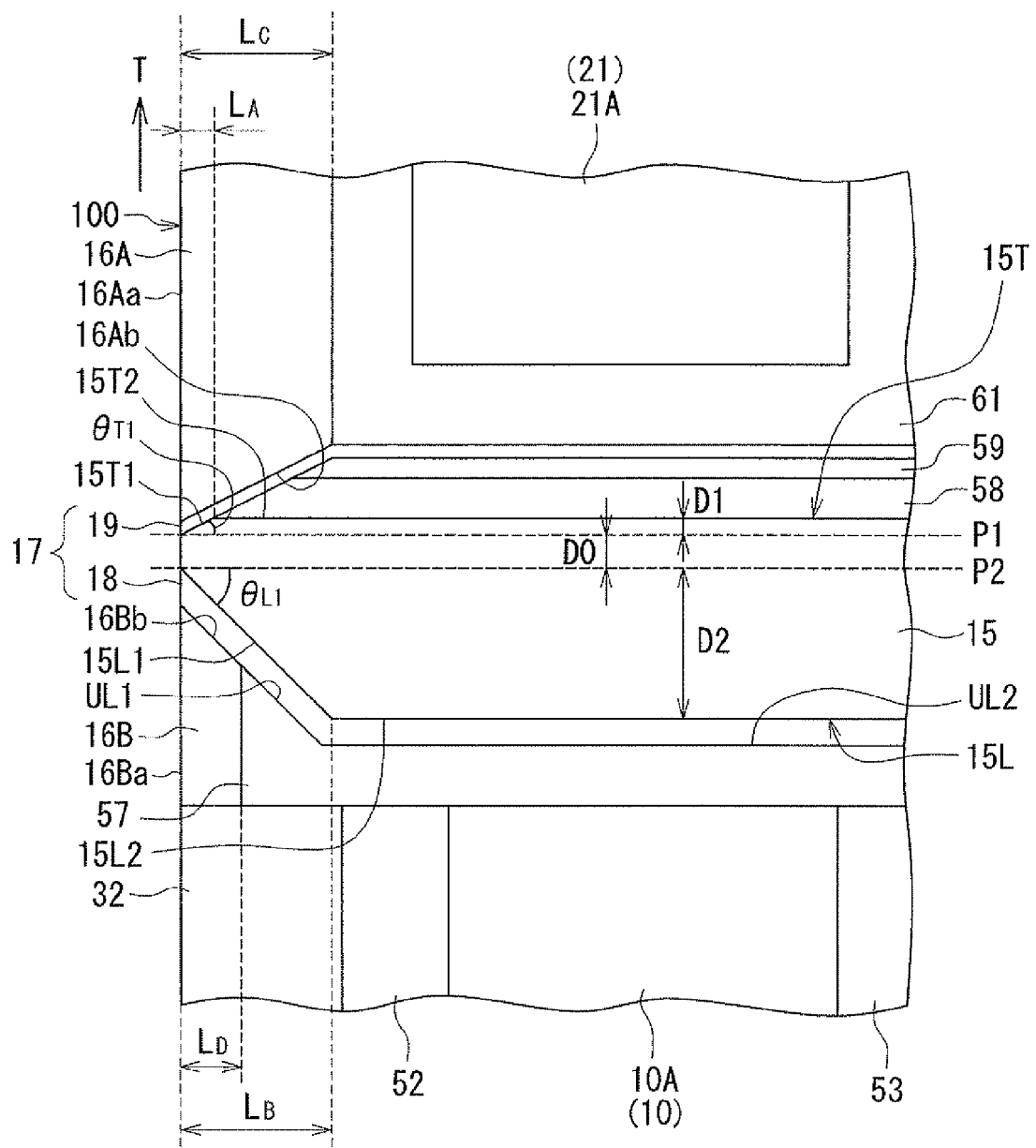
FIG. 1 is a cross-sectional view showing a part of a main pole in the vicinity of a medium facing surface in a magnetic head according to a first embodiment of the invention.
Figure 2:
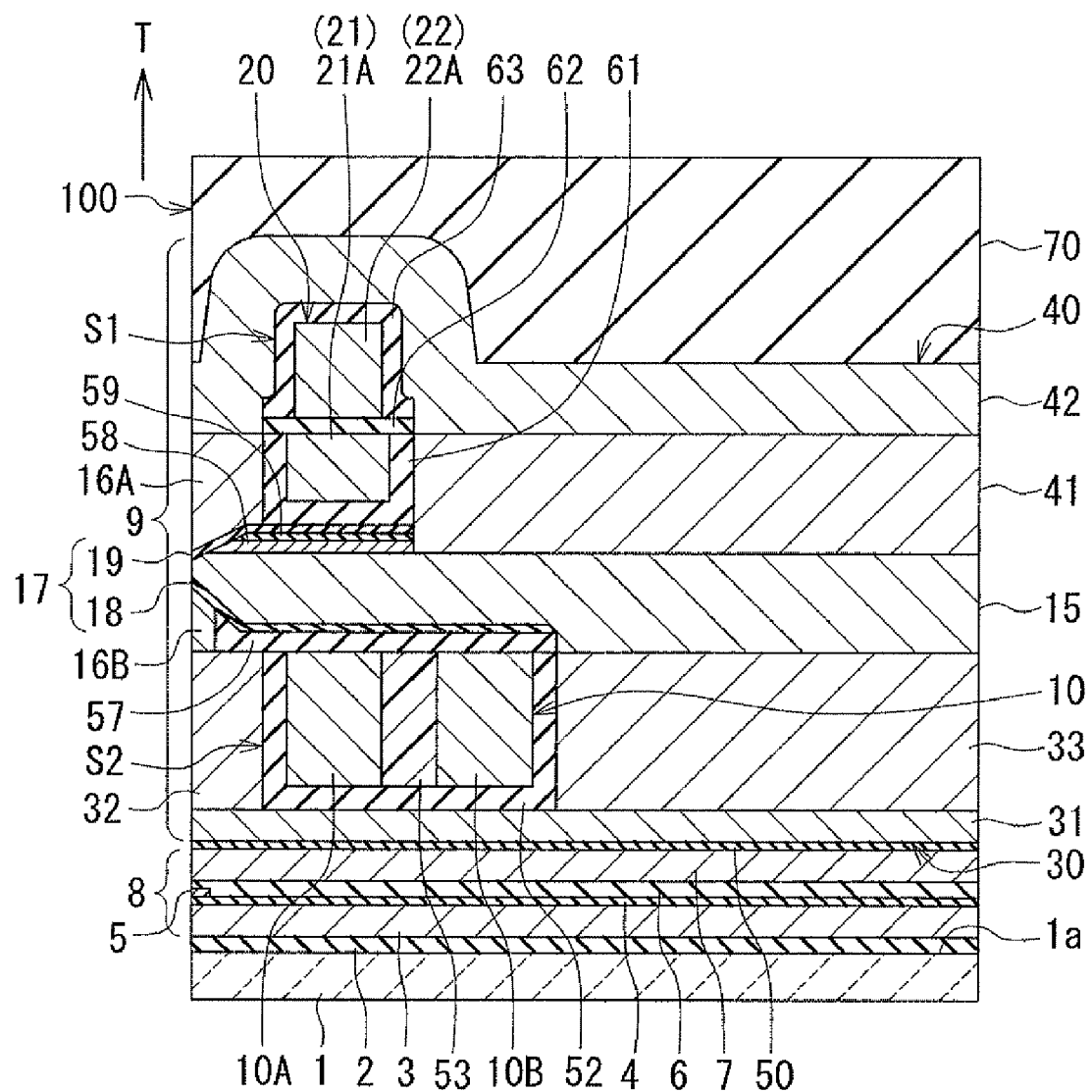
FIG. 2 is a cross-sectional view of the magnetic head according to the first embodiment of the invention.
Figure 3:
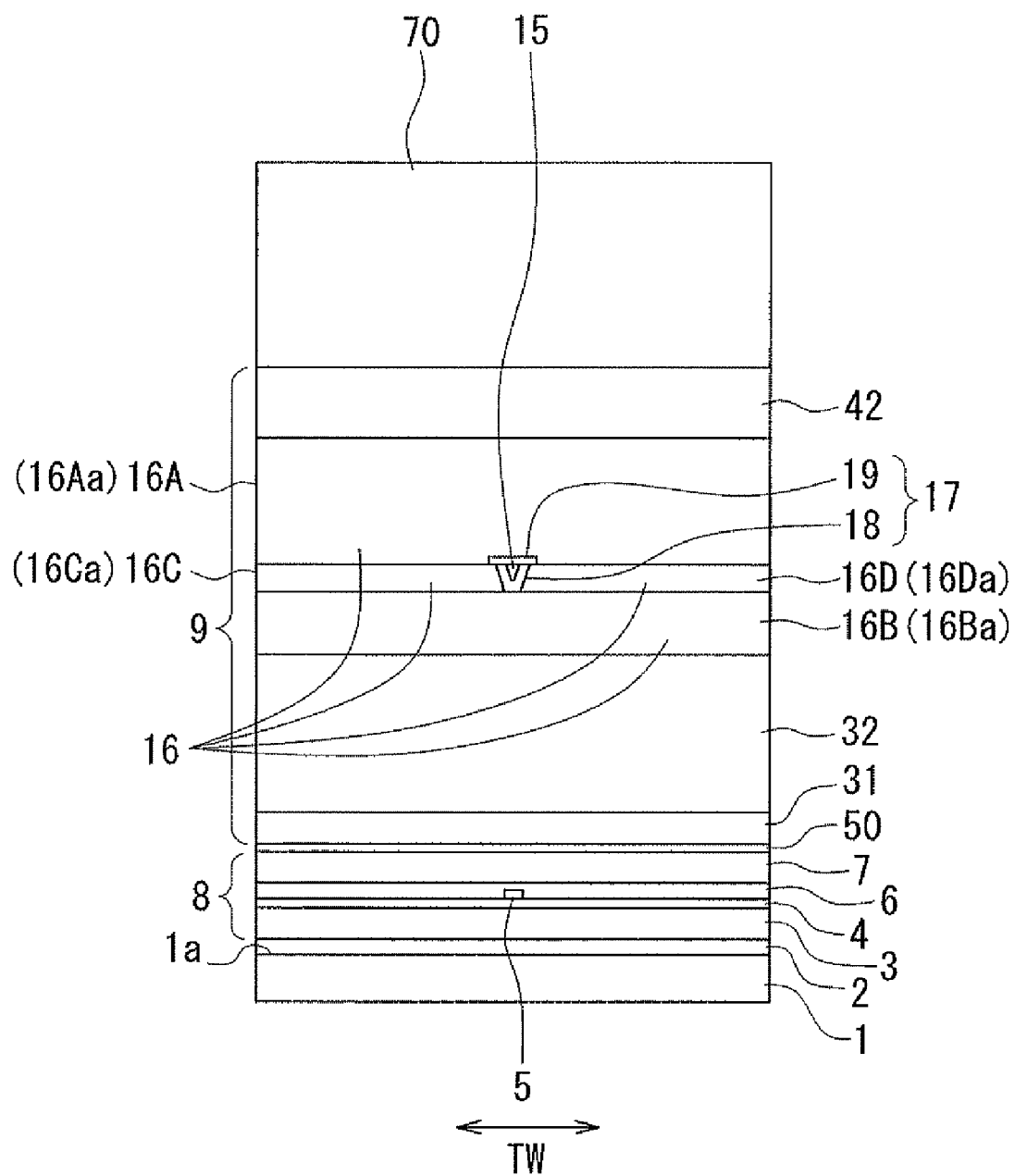
FIG. 3 is a front view showing the medium facing surface of the magnetic head according to the first embodiment of the invention.
Figure 4:
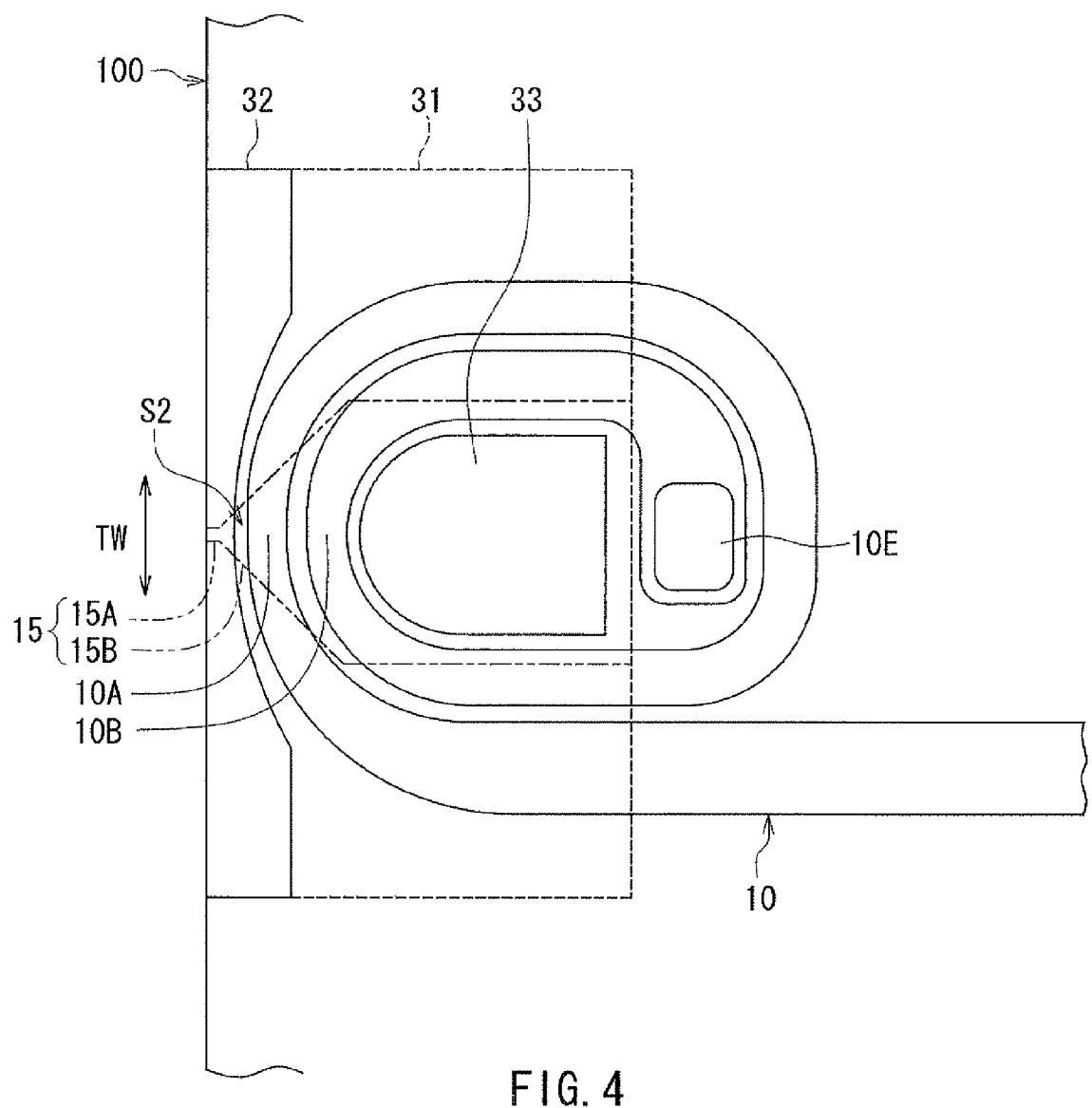
FIG. 4 is a plan view showing a second portion of a coil in the magnetic head according to the first embodiment of the invention.
Figure 5:
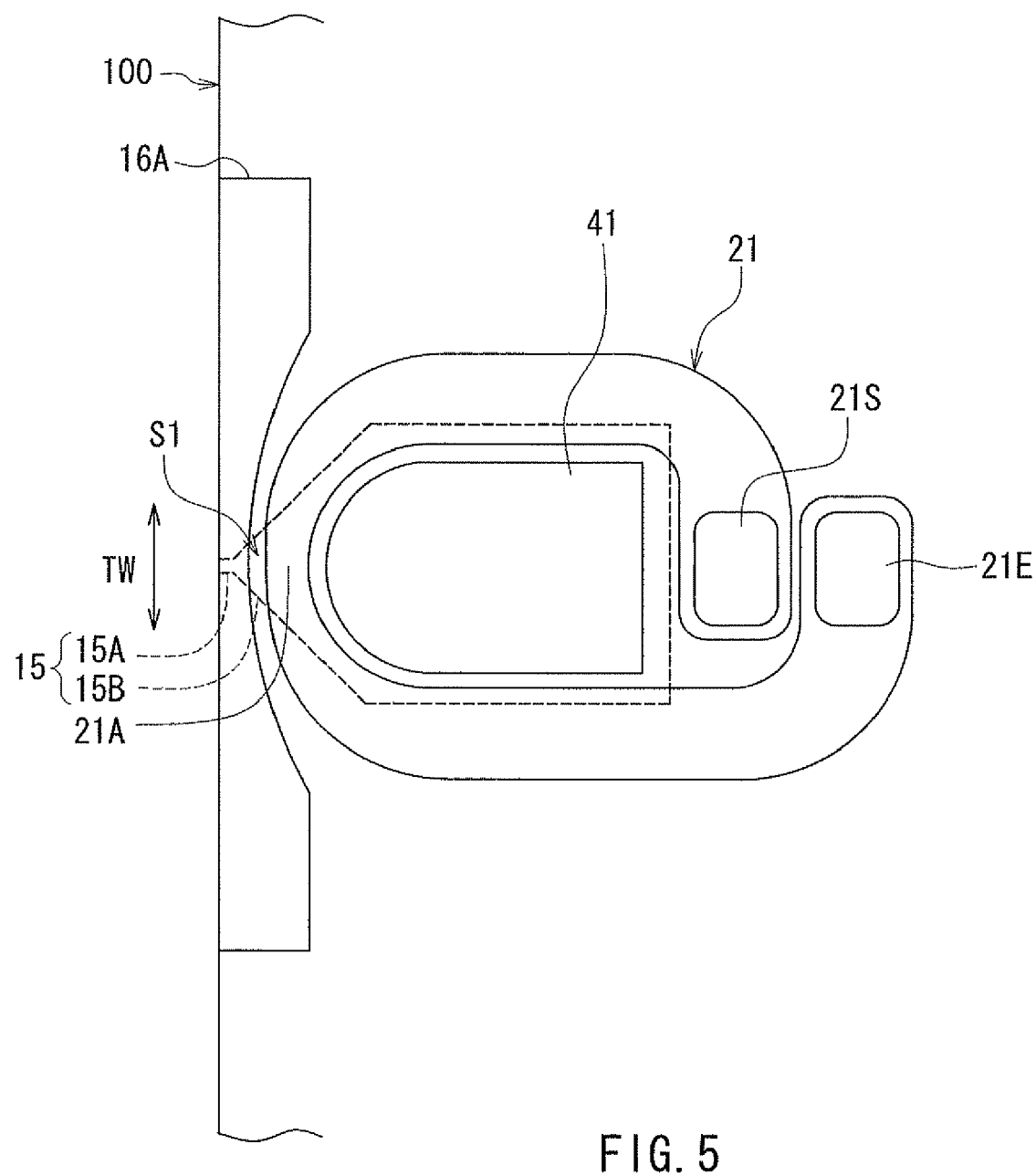
FIG. 5 is a plan view showing a first layer of a first portion of the coil in the magnetic head according to the first embodiment of the invention.
Figure 6:
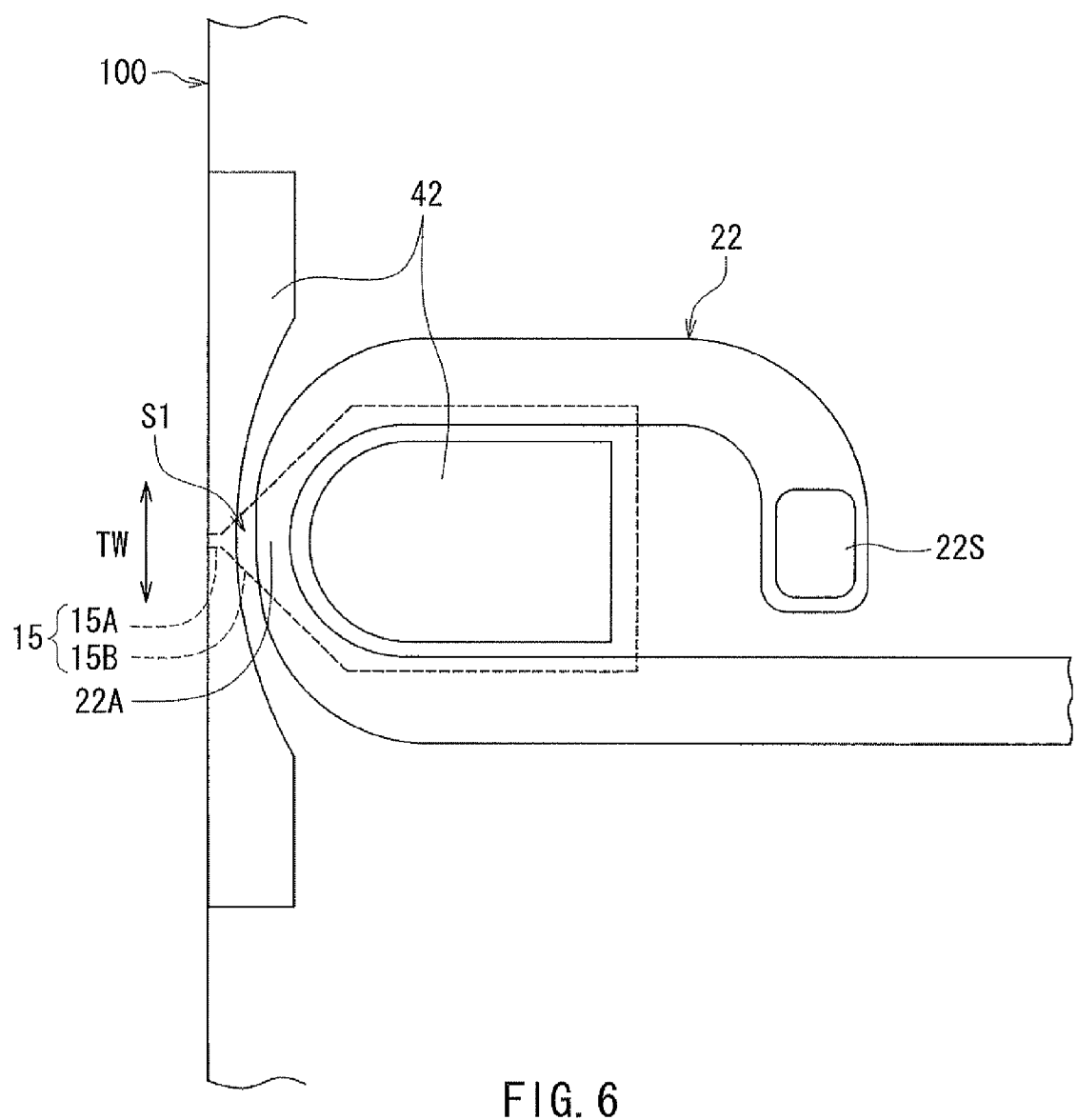
FIG. 6 is a plan view showing a second layer of the first portion of the coil in the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing a part of a main pole in the vicinity of a medium facing surface in the magnetic head according to the present embodiment. FIG. 2 is a cross-sectional view of the magnetic head according to the present embodiment. Note that FIG. 1 and FIG. 2 show cross sections perpendicular to the medium facing surface and the top surface of the substrate. The arrows with the symbol T in FIG. 1 and FIG. 2 indicate the direction of travel of the recording medium. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. The arrows with the symbol TW in FIG. 3 to FIG. 6 indicate the track width direction.

As shown in FIG. 2 and FIG. 3, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 100 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes a nonmagnetic layer 50 made of a nonmagnetic material and disposed on the second read shield layer 7, and a write head section 9 disposed on the nonmagnetic layer 50. The nonmagnetic layer 50 is made of alumina, for example. The write head section 9 includes a coil, a main pole 15, a write shield 16, and a gap part 17.

The coil produces a magnetic field corresponding to data to be written on the recording medium. The coil includes a first portion 20 and a second portion 10. The first portion 20 and the second portion 10 are both made of a conductive material such as copper. The first portion 20 and the second portion 10 are connected in series or in parallel. The main pole 15 has an end face located in the medium facing surface 100. The main pole 15 allows a magnetic flux corresponding to the magnetic field produced by the coil to pass, and produces a write magnetic field for writing data on the recording medium by means of a perpendicular magnetic recording system. FIG. 1 and FIG. 2 each show a cross section that intersects the end face of the main pole 15 located in the medium facing surface 100 and that is perpendicular to the medium facing surface 100 and the top surface 1a of the substrate 1 (the cross section will hereinafter be referred to as the main cross section).

The write shield 16 has an end face located in the medium facing surface 100. The end face of the write shield 16 includes first to fourth end face portions 16Aa, 16Ba, 16Ca, and 16Da. The first end face portion 16Aa is located forward of the end face of the main pole 15 in the direction T of travel of the recording medium. The second end face portion 16Ba is located backward of the end face of the main pole 15 in the direction T of travel of the recording medium. The third and fourth end face portions 16Ca and 16Da are located on opposite sides of the end face of the main pole 15 in the track width direction TW. In the medium facing surface 100, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located forward of the main pole 15 in the direction T of travel of the recording medium, and connects the write shield 16 and part of the main pole 15 away from the medium facing surface 100 to each other, thereby magnetically coupling the write shield 16 and the main pole 15 to each other. The second return path section 30 is located backward of the main pole 15 in the direction T of travel of the recording medium, and connects the write shield 16 and part of the main pole 15 away from the medium facing surface 100 to each other, thereby magnetically coupling the write shield 16 and the main pole 15 to each other.

The second return path section 30 includes magnetic layers 31, 32, and 33. The magnetic layer 31 is located on the nonmagnetic layer 50. The magnetic layers 32 and 33 are both located on the magnetic layer 31. The magnetic layer 32 is located near the medium facing surface 100. The magnetic layer 33 is located farther from the medium facing surface 100 than is the magnetic layer 32. Each of the magnetic layers 31 and 32 has an end face located in the medium facing surface 100. As shown in FIG. 4, the second portion 10 of the coil is wound approximately two turns around the magnetic layer 33.

The magnetic head further includes an insulating film 52 made of an insulating material and interposed between the second portion 10 and the magnetic layers 31 to 33, and an insulating layer 53 made of an insulating material and disposed in the space between adjacent turns of the second portion 10. The top surfaces of the second portion 10, the magnetic layers 32 and 33, the insulating film 52 and the insulating layer 53 are even with each other. The insulating film 52 is made of alumina, for example. The insulating layer 53 is made of photoresist, for example.

As shown in FIG. 3, the write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 in the direction T of travel of the recording medium. The second shield 16B is located backward of the main pole 15 in the direction T of travel of the recording medium. The side shields 16C and 16D magnetically couple the first shield 16A and the second shield 16B to each other.

As shown in FIG. 1, the first shield 16A includes the first end face portion 16Aa and a first slope 16Ab. The first slope 16Ab serves as a bottom surface. The second shield 16B includes the second end face portion 16Ba and a second slope 16Bb. The second slope 16Bb serves as a top surface. The first slope 16Ab and the second slope 16Bb will be described in detail later. As shown in FIG. 3, the side shield 16C includes the third end face portion 16Ca. The side shield 16D includes the fourth end face portion 16Da.

The second shield 16B is disposed on the magnetic layer 32. The magnetic head further includes a nonmagnetic layer 57 made of a nonmagnetic material. The nonmagnetic layer 57 is disposed on part of the top surface of the magnetic layer 32 and on the top surfaces of the second portion 10, the insulating film 52 and the insulating layer 53, and surrounds the second shield 16B. In the present embodiment, in particular, the nonmagnetic layer 57 is made of an insulating material since it comes into contact with the second portion 10 of the coil. The material of the nonmagnetic layer 57 is alumina, for example. The nonmagnetic layer 57 has an opening for exposing the top surface of the magnetic layer 33. The top surface of the nonmagnetic layer 57 includes a slope UL1 continuous with the second slope 16Bb, and a bottom part UL2 that is continuous with the slope UL1 and is located farther from the medium facing surface 100 than is the slope UL1.

The main pole 15 has a top surface 15T (see FIG. 1), which is a surface located at a forward end in the direction T of travel of the recording medium, and has a bottom end 15L (see FIG. 1) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is made of a nonmagnetic material and interposed between the main pole 15 and the write shield 16. The gap part 17 includes a first gap layer 19 interposed between the main pole 15 and the first shield 16A, and a second gap layer 18 interposed between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D, the top surface of the second shield 16B, and the top surface of the nonmagnetic layer 57. The second gap layer 18 is made of a nonmagnetic material. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18. The second gap layer 18 has an opening for exposing the top surface of the magnetic layer 33.

The main pole 15 is disposed over the second shield 16B and the nonmagnetic layer 57 such that the second gap layer 18 is interposed between the main pole 15 and the top surfaces of the second shield 16B and the nonmagnetic layer 57. As shown in FIG. 3, the second gap layer 18 is interposed also between the main pole 15 and each of the side shields 16C and 16D.

The bottom end 15L of the main pole 15 is in contact with the top surface of the magnetic layer 33 at a position away from the medium facing surface 100. The main pole 15 is made of a magnetic metal material. Examples of materials that can be used for the main pole 15 include NiFe, CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 100; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58, and the insulating layer 59. The first gap layer 19 is made of a nonmagnetic material. The material employed for the first gap layer 19 may be a nonmagnetic insulating material such as alumina, or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 100, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes magnetic layers 41 and 42. The magnetic layer 41 is disposed on the main pole 15 at a position away from the medium facing surface 100.

The first portion 20 of the coil includes a first layer 21 and a second layer 22. As shown in FIG. 5, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a second nonmagnetic layer (not shown) made of a nonmagnetic material and disposed around the first layer 21 and the first shield 16A. The insulating film 61 is made of alumina, for example. The second nonmagnetic layer is made of an inorganic insulating material, for example. The inorganic insulating material is alumina or silicon oxide, for example. The top surfaces of the first shield 16A, the first layer 21, the magnetic layer 41, the insulating film 61, and the second nonmagnetic layer are even with each other.

The magnetic head further includes an insulating layer 62 made of an insulating material and disposed over the top surfaces of the first layer 21 and the insulating film 61. The insulating layer 62 is made of alumina, for example.

The second layer 22 is disposed on the insulating layer 62. The magnetic head further includes an insulating film 63 made of an insulating material and disposed to cover the second layer 22 and the insulating layer 62. The magnetic layer 42 is disposed over the first shield 16A, the magnetic layer 41 and the insulating film 63, and connects the first shield 16A and the magnetic layer 41 to each other. Hereinafter, a portion of the magnetic layer 42 that lies on the first shield 16A will be referred to as the first connecting portion, and a portion of the magnetic layer 42 that lies on the magnetic layer 41 will be referred to as the second connecting portion. As shown in FIG. 6, the second layer 22 is wound approximately one turn around the second connecting portion of the magnetic layer 42. The magnetic layer 42 has an end face located in the medium facing surface 100. The insulating film 63 is made of alumina, for example.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 100, the read head section 8, and the write head section 9. The medium facing surface 100 faces the recording medium. The read head section 8 and the write head section 9 are stacked on the substrate 1. Relative to the write head section 9, the read head section 8 is disposed backward in the direction T of travel of the recording medium (i.e., disposed on the leading end side).

The read head section 8 includes: the MR element 5 serving as the read element; the first read shield layer 3 and the second read shield layer 7 for shielding the MR element 5, with their respective portions near the medium facing surface 100 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first portion 20 and the second portion 10, the main pole 15, the write shield 16, the gap part 17, the first return path section 40, and the second return path section 30. The write shield 16 includes the first shield 16A, the second shield 16B, and the two side shields 16C and 16D. The gap part 17 includes the first gap layer 19 and the second gap layer 18. The first return path section 40 and the second return path section 30 align along the direction perpendicular to the top surface 1a of the substrate 1 with the main pole 15 interposed therebetween.

The second return path section 30 includes the magnetic layers 31 to 33, and is located backward of the main pole 15 in the direction T of travel of the recording medium. As shown in FIG. 2, the second return path section 30 connects the write shield 16 and part of the main pole 15 away from the medium facing surface 100 to each other so that a second space S2 is defined by the main pole 15, the gap part 17 (the gap layer 18), the write shield 16, and the second return path section 30 (the magnetic layers 31 to 33).

The magnetic layer 32 magnetically couples the second shield 16B of the write shield 16 and the magnetic layer 31 to each other. The magnetic layer 32 has an end face that is located in the medium facing surface 100 at a position backward of the second end face portion 16Ba of the second shield 16B in the direction T of travel of the recording medium. In the main cross section, the magnetic layer 31 is greater than the second shield 16B in length in a direction perpendicular to the medium facing surface 100. In the main cross section, the magnetic layer 32 is greater than the second shield 16B and smaller than the magnetic layer 31 in length in the direction perpendicular to the medium facing surface 100.

The first return path section 40 includes the magnetic layers 41 and 42, and is located forward of the main pole 15 in the direction T of travel of the recording medium. As shown in FIG. 2, the first return path section 40 connects the write shield 16 and part of the main pole 15 away from the medium facing surface 100 to each other so that a first space S1 is defined by the main pole 15, the gap part 17 (the gap layer 19), the write shield 16, and the first return path section 40 (the magnetic layers 41 and 42).

The magnetic layer 42 magnetically couples the first shield 16A of the write shield 16 and the magnetic layer 41 to each other. The magnetic layer 42 has an end face that is located in the medium facing surface 100 at a position forward of the first end face portion 16Aa of the first shield 16A in the direction T of travel of the recording medium.

The first portion 20 and the second portion 10 of the coil will now be described in detail with reference to FIG. 4 to FIG. 6. FIG. 4 is a plan view showing the second portion 10. The second portion 10 is wound approximately two turns around the magnetic layer 33 which constitutes part of the second return path section 30. The second portion 10 includes two coil elements 10A and 10B extending to pass between the magnetic layer 32 and the magnetic layer 33, in particular, within the second space S2. Note that the coil elements refer to part of the coil winding. The coil elements 10A and 10B align in this order in the direction perpendicular to the medium facing surface 100, the coil element 10A being closer to the medium facing surface 100. The second portion 10 has a coil connection part 10E electrically connected to the first portion 20.

FIG. 5 is a plan view showing the first layer 21 of the first portion 20. The first layer 21 is wound one turn around the magnetic layer 41 which constitutes part of the first return path section 40. The first layer 21 includes a coil element 21A extending to pass between the first shield 16A and the magnetic layer 41, in particular, within the first space S1. The first layer 21 has a coil connection part 21S electrically connected to the coil connection part 10E of the second portion 10, and a coil connection part 21E electrically connected to the second layer 22. The coil connection part 21S is electrically connected to the coil connection part 10E via a columnar connection layer (not shown) that penetrates a plurality of layers interposed between the first layer 21 and the second portion 10. The connection layer is made of a conductive material such as copper.

FIG. 6 is a plan view showing the second layer 22 of the first portion 20. The second layer 22 is wound approximately one turn around the second connecting portion of the magnetic layer 42 which constitutes part of the first return path section 40. The second layer 22 includes a coil element 22A extending to pass between the first connecting portion and the second connecting portion of the magnetic layer 42, in particular, within the first space S1. The second layer 22 has a coil connection part 22S penetrating the insulating layer 62 and electrically connected to the coil connection part 21E of the first layer 21. In the example shown in FIG. 4 to FIG. 6, the first portion 20 and the second portion 10 are connected in series.

The coil elements 21A and 22A extend to pass through the first space S1, and align in the direction T of travel of the recording medium. Hereinafter, the coil elements extending to pass through the first space S1 will also be referred to as the first coil elements, and the coil elements extending to pass through the second space S2 will also be referred to as the second coil elements.

The shape of the main pole 15 will now be described in detail with reference to FIG. 1 and FIG. 4 to FIG. 6. As shown in FIG. 4 to FIG. 6, the main pole 15 includes a track width defining portion 15A and a wide portion 15B. The track width defining portion 15A has an end face located in the medium facing surface 100, and an end opposite to the end face. The wide portion 15B is connected to the end of the track width defining portion 15A. As shown in FIG. 1, the main pole 15 has: the top surface 15T which is the surface located at the forward end in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 100. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 100, then becoming constant. Here, the length of the track width defining portion 15A in the direction perpendicular to the medium facing surface 100 will be referred to as the neck height. The neck height falls within the range of 0 to 0.3 µm, for example. A zero neck height means that no track width defining portion 15A exists and an end face of the wide portion 15B is thus located in the medium facing surface 100.

The top surface 15T includes a first portion 15T1 and a second portion 15T2 that are arranged in this order of increasing distance from the medium facing surface 100. The first portion 15T1 has a first end located in the medium facing surface 100 and a second end opposite to the first end. The second portion 15T2 is connected to the second end of the first portion 15T1.

The bottom end 15L includes a third portion 15L1 and a fourth portion 15L2 that are arranged in this order of increasing distance from the medium facing surface 100. The third portion 15L1 has a first end located in the medium facing surface 100 and a second end opposite to the first end. The third portion 15L1 may be an edge formed by two intersecting planes, or may be a plane connecting two planes to each other. The fourth portion 15L2 is a plane connected to the second end of the third portion 15L1.

Here, as shown in FIG. 1, assume a first virtual plane P1 and a second virtual plane P2. The first virtual plane P1 passes through the first end of the first portion 15T1 and is perpendicular to the medium facing surface 100 and to the direction T of travel of the recording medium. The second virtual plane P2 passes through the first end of the third portion 15L1 and is perpendicular to the medium facing surface 100 and to the direction T of travel of the recording medium. The first portion 15T1 is inclined relative to the first virtual plane P1 and the medium facing surface 100 such that the second end of the first portion 15T1 is located forward of the first virtual plane P1 in the direction T of travel of the recording medium. The third portion 15L1 is inclined relative to the second virtual plane P2 and the medium facing surface 100 such that the second end of the third portion 15L1 is located backward of the second virtual plane P2 in the direction T of travel of the recording medium.

As described previously, the first shield 16A of the write shield 16 has the first slope 16Ab serving as the bottom surface. The first slope 16Ab includes a portion that is opposed to the first portion 15T1 with the first gap layer 19 of the gap part 17 therebetween. The first slope 16Ab is inclined relative to the first virtual plane P1 and the medium facing surface 100.

The second shield 16B of the write shield 16 has the second slope 16Bb serving as the top surface. The second slope 16Bb is opposed to the third portion 15L1 with the second gap layer 18 of the gap part 17 therebetween. The second slope 16Bb is inclined relative to the second virtual plane P2 and the medium facing surface 100. The nonmagnetic layer 57 includes the slope UL1 and the bottom part UL2. The slope UL1 is continuous with the second slope 16Bb and inclined relative to the second virtual plane P2 and the medium facing surface 100. The third portion 15L1 is opposed to the second slope 16Bb and the slope UL1 with the second gap layer 18 of the gap part 17 interposed between the third portion 15L1 and each of the second slope 16Bb and the slope UL1.

Here, as shown in FIG. 1, the length of the first portion 15T1 in the direction perpendicular to the medium facing surface 100 will be represented by the symbol $L_A$, the length of the third portion 15L1 in the direction perpendicular to the medium facing surface 100 will be represented by the symbol $L_B$, the length of the first slope 16Ab in the direction perpendicular to the medium facing surface 100 will be represented by the symbol $L_C$, and the length of the second slope 16Bb in the direction perpendicular to the medium facing surface 100 will be represented by the symbol $L_D$. The length $L_A$ is smaller than the lengths $L_B$ and $L_C$. The length $L_D$ is smaller than the length $L_B$. The length $L_A$ falls within the range of 0.05 to 0.15 µm, for example. The length $L_B$ falls within the range of 0.2 to 1.2 µm, for example. The length $L_C$ falls within the range of 0.2 to 0.6 µm, for example. The length $L_D$ falls within the range of 0.1 to 0.5 µm, for example.

The neck height, i.e., the distance from the medium facing surface 100 to the boundary between the track width defining portion 15A and the wide portion 15B may be equal to or different from the length $L_A$ of the first portion 15T1 or the length $L_B$ of the third portion 15L1.

As shown in FIG. 1, the angle of inclination of the first portion 15T1 relative to the first virtual plane P1 will be represented by the symbol $\theta_{T1}$, and the angle of inclination of the third portion 15L1 relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

The second portion 15T2 and the fourth portion 15L2 extend in a direction substantially perpendicular to the medium facing surface 100. As shown in FIG. 1, the thickness of the main pole 15 in the medium facing surface 100, i.e., the distance between the first virtual plane P1 and the second virtual plane P2, will be represented by the symbol D0. The distance between the second portion 15T2 and the first virtual plane P1 will be represented by the symbol D1. The distance between the fourth portion 15L2 and the second virtual plane P2 will be represented by the symbol D2. The distance D2 is greater than the distance D1. The distance D0 falls within the range of 0.05 to 0.1 µm, for example. The distance D1 falls within the range of 0.02 to 0.1 µm, for example. The distance D2 falls within the range of 0.2 to 0.8 µm, for example.

The end face of the main pole 15 located in the medium facing surface 100 has a first side adjacent to the first gap layer 19, a second side connected to a first end of the first side, and a third side connected to a second end of the first side. The first side defines the track width. The position of an end of a record bit to be recorded on the recording medium depends on the position of the first side. The end face of the main pole 15 located in the medium facing surface 100 decreases in width in the track width direction TW with increasing proximity to the bottom end 15L of the main pole 15, that is, with increasing proximity to the second virtual plane P2. Each of the second side and the third side forms an angle of, for example, 7° to 17°, or preferably 10° to 15°, relative to a direction perpendicular to the second virtual plane P2. The first side has a length in the range of 0.05 to 0.20 μm, for example.

The function and effects of the magnetic head according to the present embodiment will now be described. The magnetic head writes data on the recording medium by using the write head section 9 and reads data stored on the recording medium by using the read head section 8. In the write head section 9, the coil including the first portion 20 and the second portion 10 produces magnetic fields corresponding to data to be written on the recording medium. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also functions to capture a magnetic flux that is produced from the end face of the main pole 15 and spreads in directions other than the direction perpendicular to the plane of the recording medium, and to thereby prevent the magnetic flux from reaching the recording medium.

Furthermore, the write shield 16, the first return path section 40, and the second return path section 30 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions both backward and forward of the end face of the main pole 15 in the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first shield 16A and the second shield 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 3, the present embodiment is configured so that in the medium facing surface 100, the distance between the first and second side parts of the main pole 15 in the track width direction TW, i.e., the width of the end face of the main pole 15, decreases with increasing proximity to the second virtual plane P2. According to the present embodiment, this feature also serves to prevent adjacent track erasure induced by a skew.

The present embodiment is also configured so that in the medium facing surface 100, the distance between the first and second sidewalls of the side shields 16C and 16D in the track width direction TW decreases with increasing proximity to the second virtual plane P2, as does the distance between the first and second side parts of the main pole 15. The present embodiment thus allows both the distance between the first side part and the first sidewall and the distance between the second side part and the second sidewall to be small and constant in the medium facing surface 100. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 (the magnetic layers 41 and 42) which magnetically couples the first shield 16A of the write shield 16 and the main pole 15 to each other, and the second return path section 30 (the magnetic layers 31 to 33) which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

Furthermore, in the present embodiment, the second shield 16B is provided in addition to the second return path section 30. In the main cross section, the magnetic layer 31, which is located farthest from the main pole 15 among the magnetic layers that constitute the second return path section 30, is greater than the second shield 16B in length in the direction perpendicular to the medium facing surface 100. The second portion 10 of the coil passes through the space S2. Such a structure is more advantageous than a structure where the magnetic layer 31 also serves as the second shield. More specifically, according to the present embodiment, it is possible to bring the second shield 16B and the main pole 15 into sufficiently close proximity to each other. This enhances the function of the second shield 16B.

Now, a description will be made as to the role of the magnetic layer 32. First, suppose a case where the magnetic layer 32 is not provided and thus the second shield 16B and the magnetic layer 31 are not magnetically coupled to each other. In this case, the magnetic flux that has been captured by the second shield 16B or the side shields 16C and 16D and directed downward cannot flow toward the magnetic layer 31, and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 100. This may cause adjacent track erasure. In contrast to this, if the second shield 16B and the magnetic layer 31 are magnetically coupled to each other by the magnetic layer 32, the magnetic flux captured by the side shields 16C and 16D is divided to flow upward and downward, and the magnetic flux captured by the second shield 16B is mainly directed downward. This can prevent the adjacent track erasure that may be caused by part of the magnetic flux captured by the second shield 16B or the side shields 16C and 16D being leaked out of the medium facing surface 100.

If the second shield 16B is excessively long in the direction perpendicular to the medium facing surface 100 in the main cross section, flux leakage from the main pole 15 to the second shield 16B increases and the main pole 15 thus becomes unable to direct much magnetic flux to the medium facing surface 100. It is therefore necessary that the second shield 16B is not excessively long in the direction perpendicular to the medium facing surface 100 in the main cross section. In the main cross section, if the length of the magnetic layer 32 in the direction perpendicular to the medium facing surface 100 is equal to or smaller than that of the second shield 16B, the magnetic layer 32 cannot direct much magnetic flux from the second shield 16B to the magnetic layer 31. In the present embodiment, in contrast, the magnetic layer 32 is configured so that in the main cross section, the length of the magnetic layer 32 in the direction perpendicular to the medium facing surface 100 is greater than that of the second shield 16B and smaller than that of the magnetic layer 31. Consequently, the present embodiment allows the magnetic layer 32 to direct much magnetic flux from the second shield 16B to the magnetic layer 31.

The position of an end of the record bit to be recorded on the recording medium depends on the position of an end of the end face of the main pole 15 located in the medium facing surface 100, the end being located forward in the direction T of travel of the recording medium. Accordingly, in order to define the position of the end of the record bit accurately, it is particularly important for the first shield 16A, of the first and second shields 16A and 16B, to be capable of capturing as much magnetic flux as possible. In the present embodiment, the first shield 16A is greater in volume than the second shield 16B and is thus capable of capturing more magnetic flux than the second shield 16B.

In the present embodiment, the top surface 15T of the main pole 15 includes the first portion 15T1 inclined relative to the first virtual plane P1 and the medium facing surface 100, while the bottom end 15L of the main pole 15 includes the third portion 15L1 inclined relative to the second virtual plane P2 and the medium facing surface 100. The main pole 15 of such a shape allows the prevention of adjacent track erasure induced by a skew because the main pole 15 has a small thickness in the medium facing surface 100. On the other hand, since a part of the main pole 15 away from the medium facing surface 100 has a large thickness, it is possible for the main pole 15 to direct much magnetic flux to the medium facing surface 100, and this makes it possible to improve write characteristics such as the overwrite property.

In the present embodiment, the length $L_A$ of the first portion 15T1 in the direction perpendicular to the medium facing surface 100 is smaller than the length $L_C$ of the first slope 16Ab in the direction perpendicular to the medium facing surface 100. If the length $L_A$ is equal to the length $L_C$ shown in FIG. 1, the first portion 15T1 and the first slope 16Ab are opposed to each other over a large area with a small spacing therebetween. This leads to a problem that a large amount of magnetic flux leaks from the main pole 15 to the first shield 16A, and causes degradation in write characteristics such as the overwrite property. To prevent this, the length $L_C$ may be reduced to make the relationship between the lengths $L_A$ and $L_C$ opposite to that shown in FIG. 1. This, however, reduces the volume of the first shield 16A of the write shield 16 which is located forward of the main pole 15 in the direction T of travel of the recording medium, and thereby compromises the function of the write shield. More specifically, a reduction in the volume of the first shield 16A is likely to cause magnetic flux saturation in the first shield 16A. This in turn leads to magnetic flux leakage from the first shield 16A to the medium facing surface 100, raising a problem that the magnetic flux leakage may result in accidental erasure of data stored on the recording medium.

In the present embodiment, the length $L_A$ is made smaller than the length $L_C$ to allow the first portion 15T1 and the first slope 16Ab to be opposed to each other over a smaller area. This makes it possible to prevent magnetic flux leakage from the main pole 15 to the first shield 16A without compromising the function of the write shield 16. However, this causes the distance D1 between the second portion 15T2 and the first virtual plane P1 to be small, and cannot therefore serve to sufficiently increase the thickness of a portion of the main pole 15 located away from the medium facing surface 100.

To cope with this, in the present embodiment, the distance D2 between the fourth portion 15L2 and the second virtual plane P2 is made greater than the distance D1 between the second portion 15T2 and the first virtual plane P1, and the length $L_A$ of the first portion 15T1 is made smaller than the length $L_B$ of the third portion 15L1. This makes it possible to reduce the thickness of the main pole 15 in the medium facing surface 100 and to sufficiently increase the thickness of a portion of the main pole 15 that is located farther from the medium facing surface 100 than is the third portion 15L1, while preventing magnetic flux leakage from the main pole 15 to the first shield 16A as described above. According to the present embodiment, it is thereby possible to prevent the skew-induced problems and provide improved write characteristics.

Furthermore, in the present embodiment, the length $L_D$ of the second slope 16Bb is smaller than the length $L_B$ of the third portion 15L1. According to the present embodiment, this allows the third portion 15L1 and the second slope 16Bb to be opposed to each other over a smaller area, thereby allowing prevention of magnetic flux leakage from the main pole 15 to the second shield 16B. Note that since the length $L_B$ of the third portion 15L1 can be sufficiently increased, it is possible to prevent the volume of the second shield 16B from being excessively reduced even if the length $L_D$ is made smaller than the length $L_B$.

Consequently, according to the present embodiment, it is possible to prevent the skew-induced problems and provide improved write characteristics without compromising the function of the write shield 16.

A method of manufacturing the magnetic head according to the present embodiment will now be described. In the method of manufacturing the magnetic head according to the present embodiment, first, as shown in FIG. 2 and FIG. 3, the insulating layer 2, the first read shield layer 3, and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7 and the nonmagnetic layer 50 are formed in this order on the second read shield gap film 6.

Next, the magnetic layer 31 is formed on the nonmagnetic layer 50 by frame plating, for example. Then, a not-shown insulating layer is formed over the entire top surface of the stack. The insulating layer is then polished by, for example, chemical mechanical polishing (hereinafter referred to as CMP), until the magnetic layer 31 is exposed. The top surfaces of the magnetic layer 31 and the insulating layer are thereby made even with each other.

Next, the magnetic layers 32 and 33 are formed on the magnetic layer 31 by frame plating, for example. The insulating film 52 is then formed over the entire top surface of the stack. Next, the second portion 10 of the coil is formed by frame plating, for example. The insulating layer 53 is then formed in the space between adjacent turns of the second portion 10. The second portion 10 and the insulating layer 53 are formed such that their top surfaces are higher in level than the top surface of the portion of the insulating film 52 lying on the magnetic layers 32 and 33. Next, a not-shown insulating layer is formed over the entire top surface of the stack. The second portion 10, the insulating film 52, the insulating layer 53 and the not-shown insulating layer are then polished by, for example, CMP, until the magnetic layers 32 and 33 are exposed. The top surfaces of the second portion 10, the magnetic layers 32 and 33, the insulating film 52, the insulating layer 53 and the not-shown insulating layer are thereby made even with each other.

Reference is now made to FIG. 7A through FIG. 13B to describe a series of steps to be performed after the aforementioned step up to the step of determining the shape of the top surface 15T of the main pole 15. FIG. 7A through FIG. 13B each show a stack of layers in the process of manufacturing the magnetic head. FIG. 7A to FIG. 13A each show a cross section perpendicular to the medium facing surface 100 and the top surface 1a of the substrate 1, or the main cross section, in particular. FIG. 7B to FIG. 13B each show a cross section of the stack taken at the position where the medium facing surface 100 is to be formed. The parts that are closer to the substrate 1 than are the second shield 16B and the nonmagnetic layer 57 are not shown in FIG. 7A through FIG. 13B. The symbol "ABS" in FIG. 7A to FIG. 13A indicates the position where the medium facing surface 100 is to be formed.

Figure 7A:
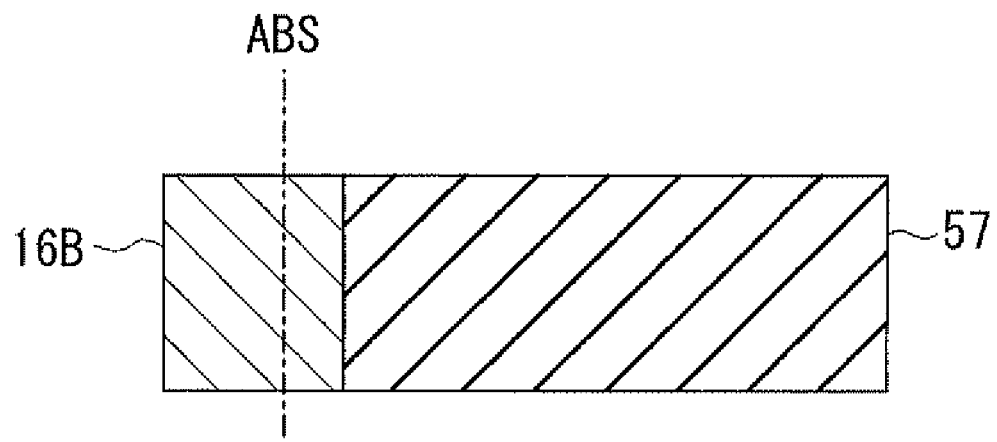
FIG. 7A and FIG. 7B are cross-sectional views showing a step of a method of manufacturing the magnetic head according to the first embodiment of the invention.
Figure 7B:
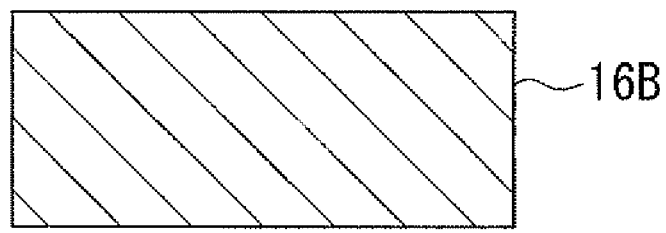

In the step shown in FIG. 7A and FIG. 7B, first, the second shield 16B is formed on the magnetic layer 32 by frame plating, for example. Next, the nonmagnetic layer 57 is formed over the entire top surface of the stack. The nonmagnetic layer 57 is then polished by, for example, CMP, until the second shield 16B is exposed. The top surfaces of the second shield 16B and the nonmagnetic layer 57 are thereby made even with each other.

Figure 8A:
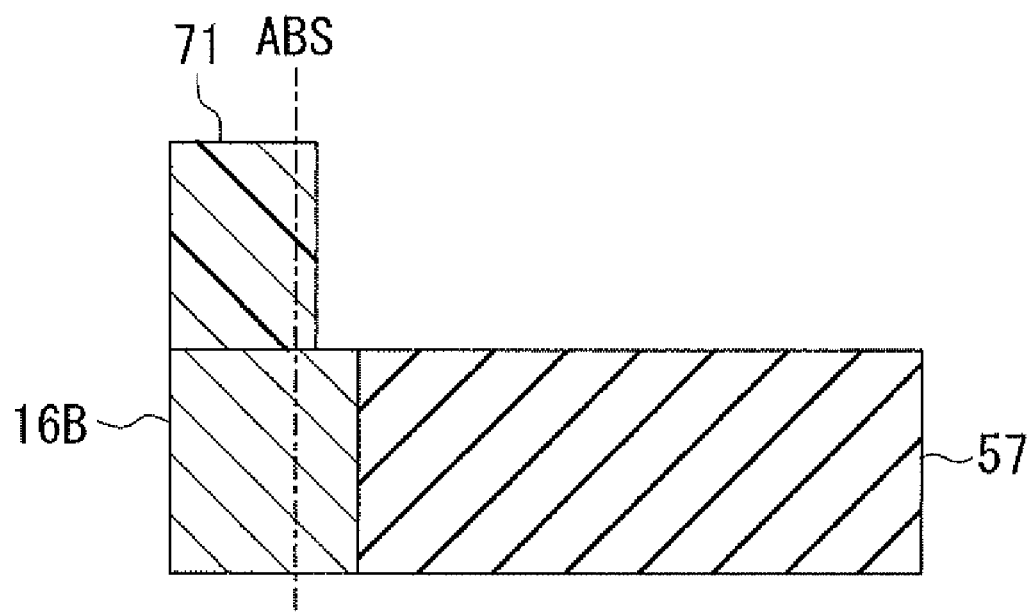
FIG. 8A and FIG. 8B are cross-sectional views showing a step that follows the step shown in FIG. 7A and FIG. 7B.
Figure 8B:
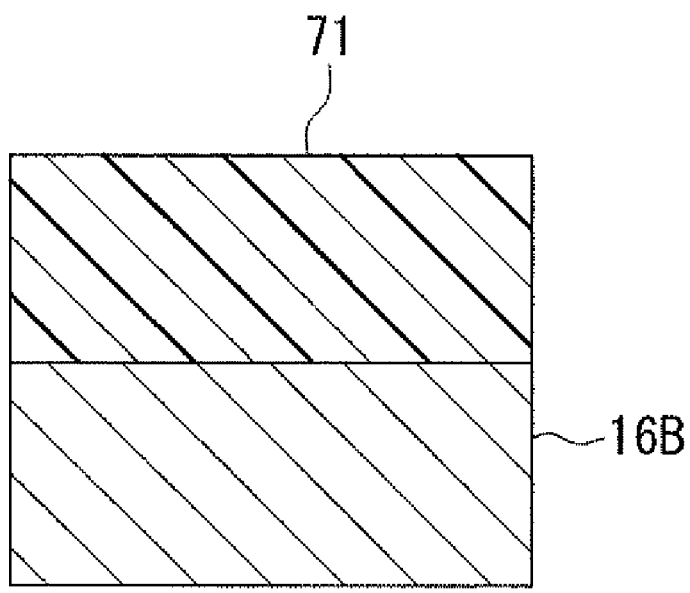

FIG. 8A and FIG. 8B show the next step. In this step, a mask 71 is formed on the second shield 16B. The mask 71 is formed by patterning a photoresist layer. As shown in FIG. 8A, the mask 71 does not cover a part of the second shield 16B located in the vicinity of the boundary between the second shield 16B and the nonmagnetic layer 57.

Figure 9A:
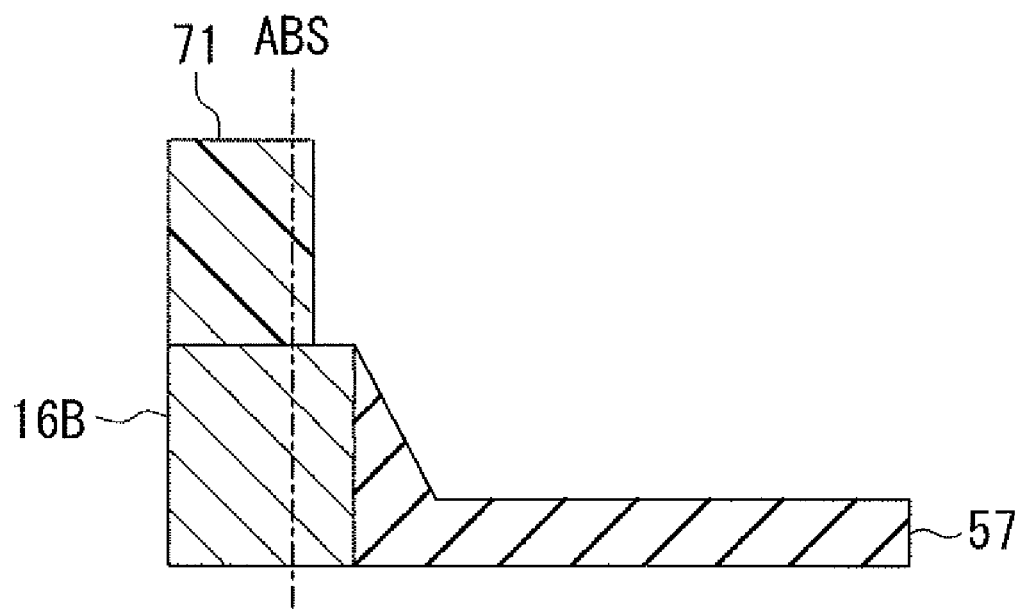
FIG. 9A and FIG. 9B are cross-sectional views showing a step that follows the step shown in FIG. 8A and FIG. 8B.
Figure 9B:
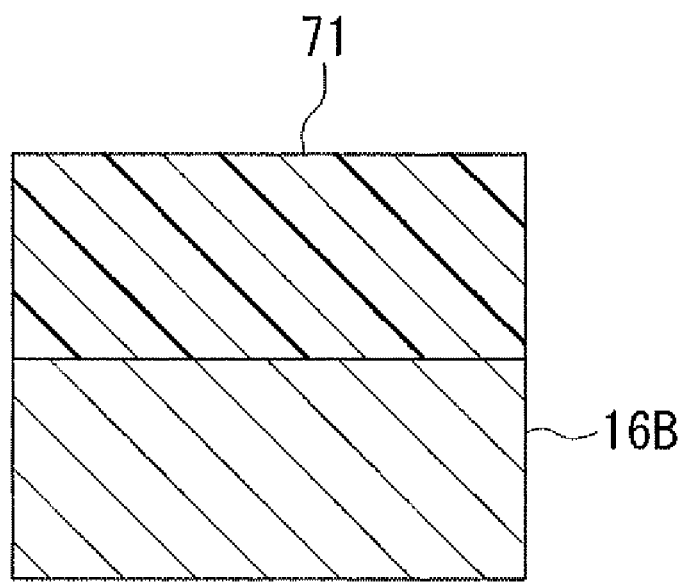

FIG. 9A and FIG. 9B show the next step. In this step, the nonmagnetic layer 57 is etched by using the mask 71 and the second shield 16B as an etching mask. The etching proceeds until the etched bottom reaches a level between the top and bottom surfaces of the nonmagnetic layer 57 as originally formed. The etching is performed by, for example, reactive ion etching under such a condition that, as shown in FIG. 9A, a portion of the nonmagnetic layer 57 as originally formed remains to form a slope in the vicinity of the boundary between the nonmagnetic layer 57 as originally formed and the second shield 16B. The mask 71 is then removed.

Figure 10A:
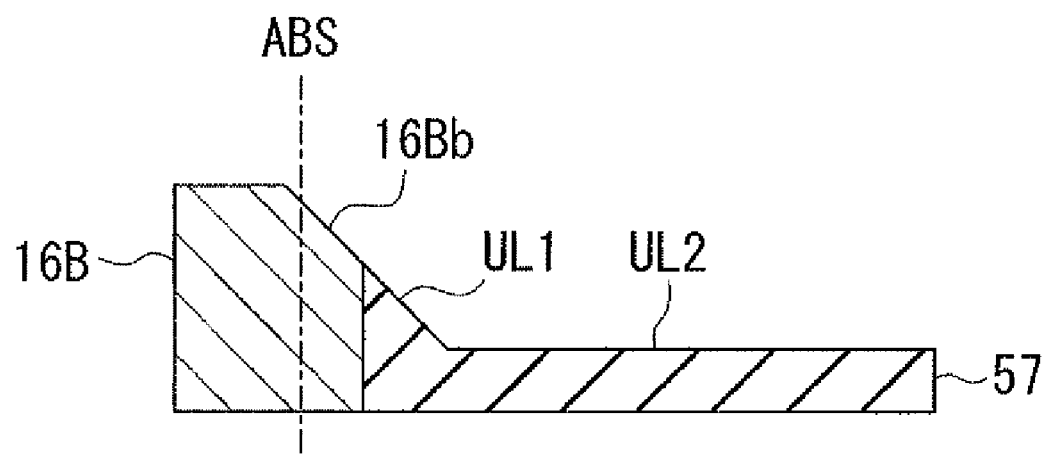
FIG. 10A and FIG. 10B are cross-sectional views showing a step that follows the step shown in FIG. 9A and FIG. 9B.
Figure 10B:
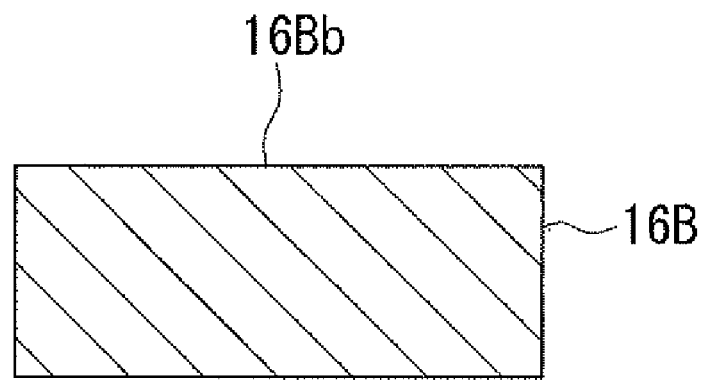

FIG. 10A and FIG. 10B show the next step. In this step, etching is performed to etch a portion of the top surface of the second shield 16B in the vicinity of the position ABS where the medium facing surface 100 is to be formed, and a portion of the nonmagnetic layer 57 that is located in the vicinity of the boundary between the nonmagnetic layer 57 as originally formed and the second shield 16B. This etching is performed by, for example, ion beam etching so that the top surface of the second shield 16B is provided with the second slope 16Bb as shown in FIG. 10A. This etching is performed also so that the top surface of the nonmagnetic layer 57 after being etched has the slope UL1 and the bottom part UL2. The angle of inclination of the second slope 16Bb and that of the slope UL1 are equal or nearly equal to the angle of inclination θm of the third portion 15L1 of the bottom end 15L of the main pole 15 to be formed later. The bottom part UL2 extends in a direction substantially perpendicular to the medium facing surface 100 to be formed later.

Figure 11A:
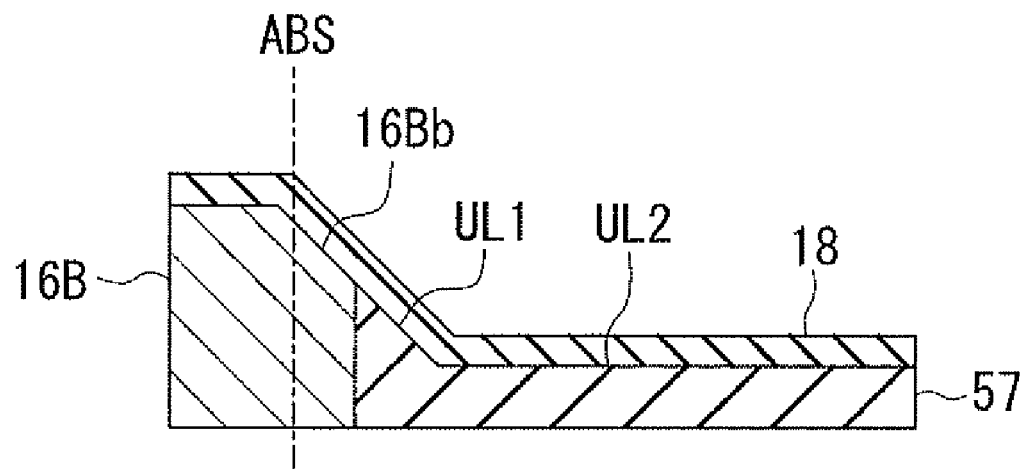
FIG. 11A and FIG. 11B are cross-sectional views showing a step that follows the step shown in FIG. 10A and FIG. 10B.
Figure 11B:
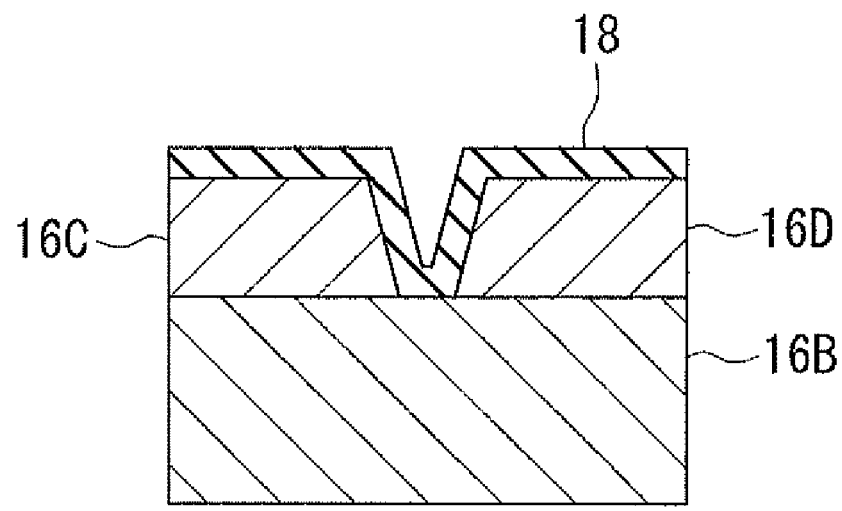

FIG. 11A and FIG. 11B show the next step. In this step, first, the side shields 16C and 16D are formed on the second shield 16B. Here, a method of forming the side shields 16C and 16D will be described by way of example. In the method, first, a photoresist layer made of a positive photoresist is patterned by photolithography to form a first resist layer on regions of the top surface of the second shield 16B where the side shields 16C and 16D are to be formed later. The first resist layer has two portions that have shapes corresponding to the shapes of the side shields 16C and 16D to be formed later. Next, a separating film made of a nonmagnetic material is formed to cover the first resist layer. The separating film is provided to prevent the first resist layer of a positive photoresist from being mixed with a photoresist layer of a negative photoresist to be formed later. Examples of materials suitable for the separating film include alumina and a synthetic resin.

Next, a second resist layer is formed on the separating film by patterning a photoresist layer of a negative photoresist by photolithography. The second resist layer is to later become a mold. The second resist layer has two openings that have shapes corresponding to the shapes of the side shields 16C and 16D to be formed later. Next, by performing wet etching, for example, the separating film is removed in the part thereof not covered by the second resist layer. The first and second resist layers are then exposed to light. Thereafter, the first resist layer is removed from the two openings of the second resist layer by using an alkaline developer, for example. When the first resist layer is removed or after the first resist layer has been removed, the separating film is removed in the part thereof extending along the wall faces of the two openings of the second resist layer. As a result of this step, the second resist layer becomes the mold which is formed in a region excluding the regions where the side shields 16C and 16D are to be formed later. Next, the side shields 16C and 16D are formed on the top surface of the second shield 16B by performing plating without forming any seed layer. The side shields 16C and 16D are respectively formed in the two openings of the mold. The mold and the separating film are then removed.

FIG. 11B shows the side shields 16C and 16D thus formed. The side shields 16C and 16D have mutually opposing sidewalls in the vicinity of the position ABS where the medium facing surface 100 is to be formed. The top surface of the second shield 16B is exposed between the sidewalls of the side shields 16C and 16D.

Next, the second gap layer 18 is formed to cover the second shield 16B and the side shields 16C and 16D. Where alumina is employed as the material of the second gap layer 18, the second gap layer 18 is formed by atomic layer deposition, for example. Where Ru is employed as the material of the second gap layer 18, the second gap layer 18 is formed by chemical vapor deposition, for example.

Figure 12A:
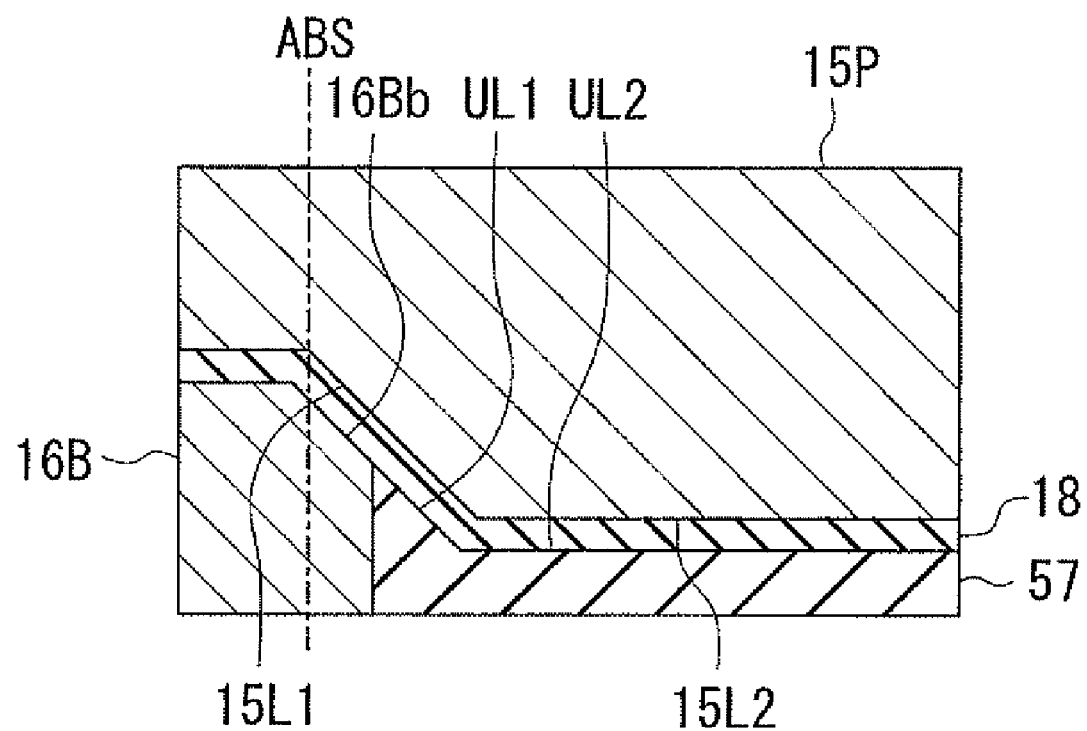
FIG. 12A and FIG. 12B are cross-sectional views showing a step that follows the step shown in FIG. 11A and FIG. 11B.
Figure 12B:
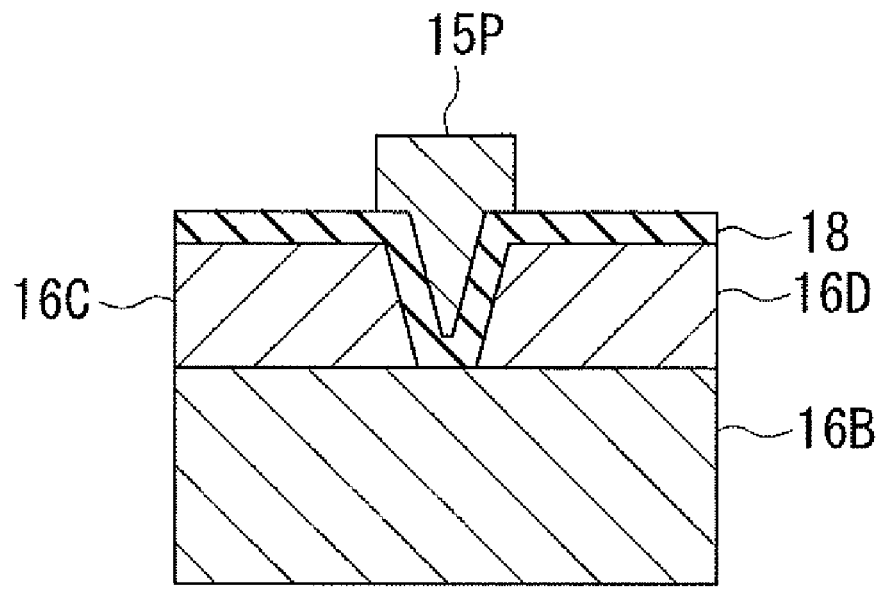

FIG. 12A and FIG. 12B show the next step. In this step, first, although not shown, a seed layer is formed over the entire top surface of the stack by sputtering or ion beam deposition, for example. The second gap layer 18 and the seed layer are then selectively etched to form therein openings for exposing the top surface of the magnetic layer 33 and openings for exposing the coil connection part 10E (see FIG. 4) of the second portion 10. Next, portions of the nonmagnetic layer 57 exposed from the two openings of the second gap layer 18 and the seed layer are removed by etching. Note that the nonmagnetic layer 57 may be etched at the same time as when the second gap layer 18 and the seed layer are etched. Next, a magnetic layer 15P and a not-shown connection layer are formed by frame plating, for example. The magnetic layer 15P is to become the main pole 15 later. The magnetic layer 15P and the connection layer are formed such that their top surfaces are higher in level than the top surfaces of portions of the seed layer lying on the side shields 16C and 16D.

Figure 13A:
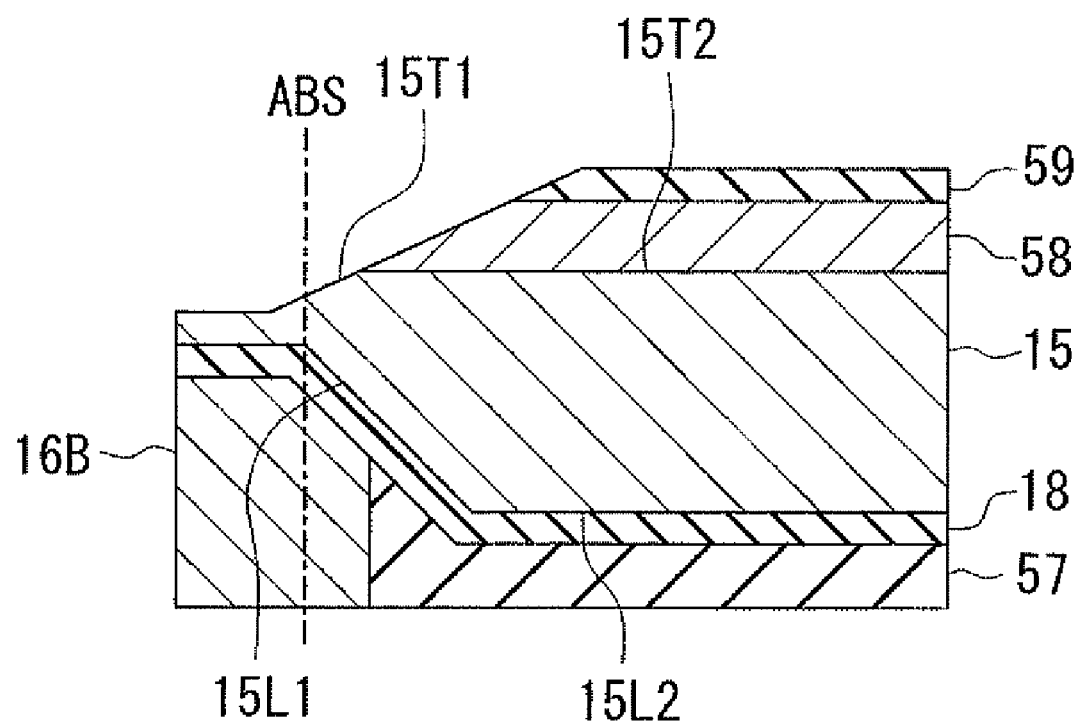
FIG. 13A and FIG. 13B are cross-sectional views showing a step that follows the step shown in FIG. 12A and FIG. 12B.
Figure 13B:
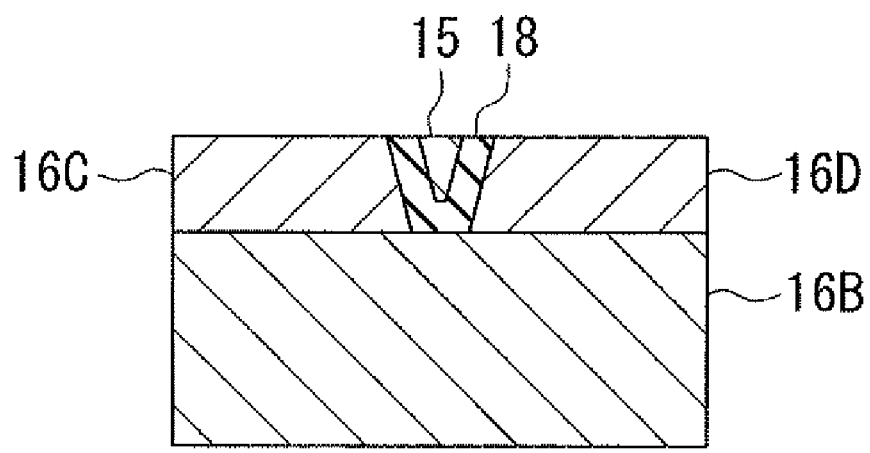

FIG. 13A and FIG. 13B show the next step. In this step, first, the first nonmagnetic layer is formed to cover the second gap layer 18, the magnetic layer 15P and the connection layer. The magnetic layer 15P, the second gap layer 18, the connection layer, and the first nonmagnetic layer are then polished by, for example, CMP, until the side shields 16C and 16D are exposed. Next, a first mask layer and a second mask layer, which are to later become the nonmagnetic metal layer 58 and the insulating layer 59, respectively, are formed over the magnetic layer 15P and the side shields 16C and 16D. Using the first and second mask layers as an etching mask, portions of the magnetic layer 15P, the side shields 16C and 16D and the second gap layer 18 are then etched by ion beam etching, for example. As a result, the first mask layer becomes the nonmagnetic metal layer 58, the second mask layer becomes the insulating layer 59, and the magnetic layer 15P becomes the main pole 15.

Where ion beam etching is employed to etch the portions of the magnetic layer 15P, the side shields 16C and 16D and the second gap layer 18, the etching is performed such that ion beams travel in a direction at an angle of 40° to 75° relative to the direction perpendicular to the top surface 1a of the substrate 1 and that the direction of travel of the ion beams is caused to rotate as viewed in the direction perpendicular to the top surface 1a of the substrate 1. Performing ion beam etching in such a manner provides the top surface of the magnetic layer 15P with the first portion 15T1 and the second portion 15T2. The shape of the top surface 15T of the main pole 15 is thus determined.

Steps that follow the step of FIG. 13A and FIG. 13B will now be described with reference to FIG. 2, FIG. 3, FIG. 5, and FIG. 6. First, the first gap layer 19 is formed over the entire top surface of the stack by sputtering or chemical vapor deposition, for example. The first gap layer 19, the nonmagnetic metal layer 58, and the insulating layer 59 are then selectively etched by, for example, ion beam etching, so that part of the top surface 15T of the main pole 15, part of each of the top surfaces of the side shields 16C and 16D, and the top surface of the connection layer are exposed. Then, frame plating, for example, is performed to form the first shield 16A over the side shields 16C and 16D and the first gap layer 19, and form the magnetic layer 41 on the main pole 15.

Next, the insulating film 61 is formed over the entire top surface of the stack. The insulating film 61 is then selectively etched by, for example, ion beam etching, so that the top surface of the connection layer is exposed. Then, the first layer 21 of the first portion 20 of the coil is formed by frame plating, for example. The first layer 21 is formed such that its top surface is higher in level than the top surface of a portion of the insulating film 61 lying over the first shield 16A and the magnetic layer 41. Next, the second nonmagnetic layer is formed over the entire top surface of the stack. The first layer 21, the insulating film 61, and the second nonmagnetic layer are then polished by, for example, CMP, until the first shield 16A and the magnetic layer 41 are exposed. The top surfaces of the first shield 16A, the first layer 21, the magnetic layer 41, the insulating film 61, and the second nonmagnetic layer are thereby made even with each other.

Next, the insulating layer 62 is formed over the entire top surface of the stack. The insulating layer 62 is then selectively etched by, for example, ion beam etching, so that the coil connection part 21E of the first layer 21 is exposed. Then, the second layer 22 of the first portion 20 of the coil is formed by frame plating, for example. Next, the insulating film 63 is formed over the entire top surface of the stack. The insulating layer 62 and the insulating film 63 are then selectively etched by, for example, ion beam etching, so that the top surface of the first shield 16A and the top surface of the magnetic layer 41 are exposed. Then, the magnetic layer 42 is formed over the first shield 16A, the magnetic layer 41 and the insulating film 63 by frame plating, for example.

Next, the protective layer 70 is formed to cover the entire top surface of the stack. Wiring, terminals and other components are then formed on the protective layer 70, and the substrate 1 is cut near the position ABS. The cut surface is polished to form the medium facing surface 100, and then fabrication of flying rails and other processes are performed to complete the magnetic head.

Second Embodiment

Figure 14:
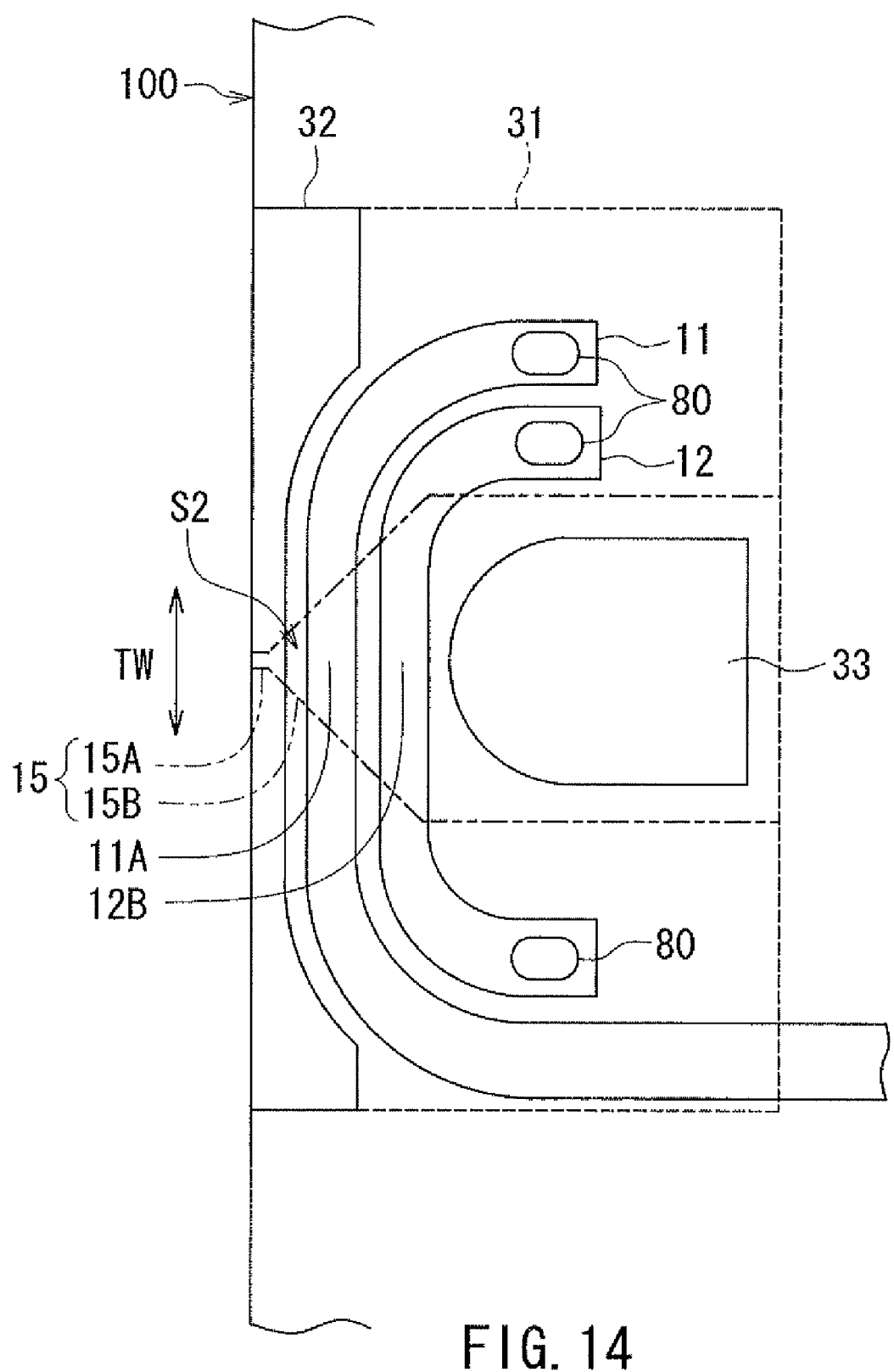
FIG. 14 is a plan view showing a plurality of second coil elements of a coil in a magnetic head according to a second embodiment of the invention.
Figure 15:
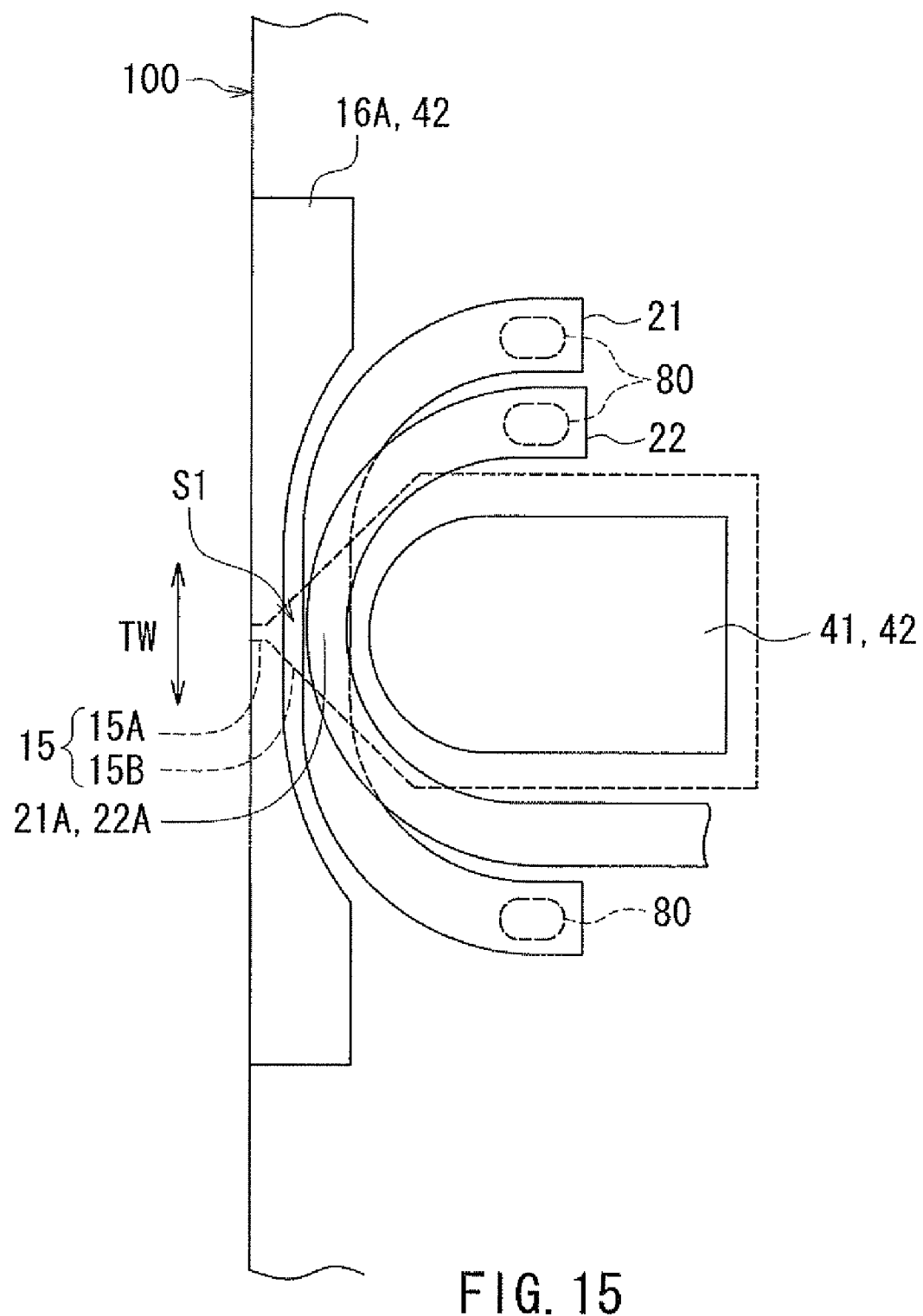
FIG. 15 is a plan view showing a plurality of first coil elements of the coil in the magnetic head according to the second embodiment of the invention.

A magnetic head according to a second embodiment of the invention will now be described with reference to FIG. 14 and FIG. 15. FIG. 14 is a plan view showing a plurality of second coil elements of the coil of the magnetic head according to the present embodiment. FIG. 15 is a plan view showing a plurality of first coil elements of the coil of the magnetic head according to the present embodiment.

The magnetic head according to the present embodiment is different from the magnetic head according to the first embodiment in the following respects. In the magnetic head according to the present embodiment, the coil is wound approximately two turns around the main pole 15. The coil of the present embodiment has two line-shaped portions 11 and 12 shown in FIG. 14, instead of the second portion 10 of the first embodiment shown in FIG. 4. The coil of the present embodiment further has a first layer 21 and a second layer 22 shaped as shown in FIG. 15, instead of the first layer 21 and the second layer 22 of the first embodiment shown in FIG. 5 and FIG. 6. As shown in FIG. 14, the line-shaped portions 11 and 12 respectively include second coil elements 11A and 12B extending to pass through the second space S2. The second coil elements 11A and 12B align in this order in the direction perpendicular to the medium facing surface 100, the coil element 11A being closer to the medium facing surface 100.

As shown in FIG. 15, the first layer 21 and the second layer 22 of the present embodiment respectively include first coil elements 21A and 22A extending to pass through the first space S1. The coil element 21A passes between the first shield 16A and the magnetic layer 41, in particular. The coil element 22A passes between the first connecting portion and the second connecting portion of the magnetic layer 42, in particular.

The line-shaped portions 11 and 12 are electrically connected to the first layer 21 and the second layer 22 via three columnar connection layers 80, which penetrate a plurality of layers interposed therebetween, so as to form a coil that is wound helically around the main pole 15.

The remainder of configuration, function and effects of the present embodiment are similar to those of the first embodiment.

Third Embodiment

Figure 16:
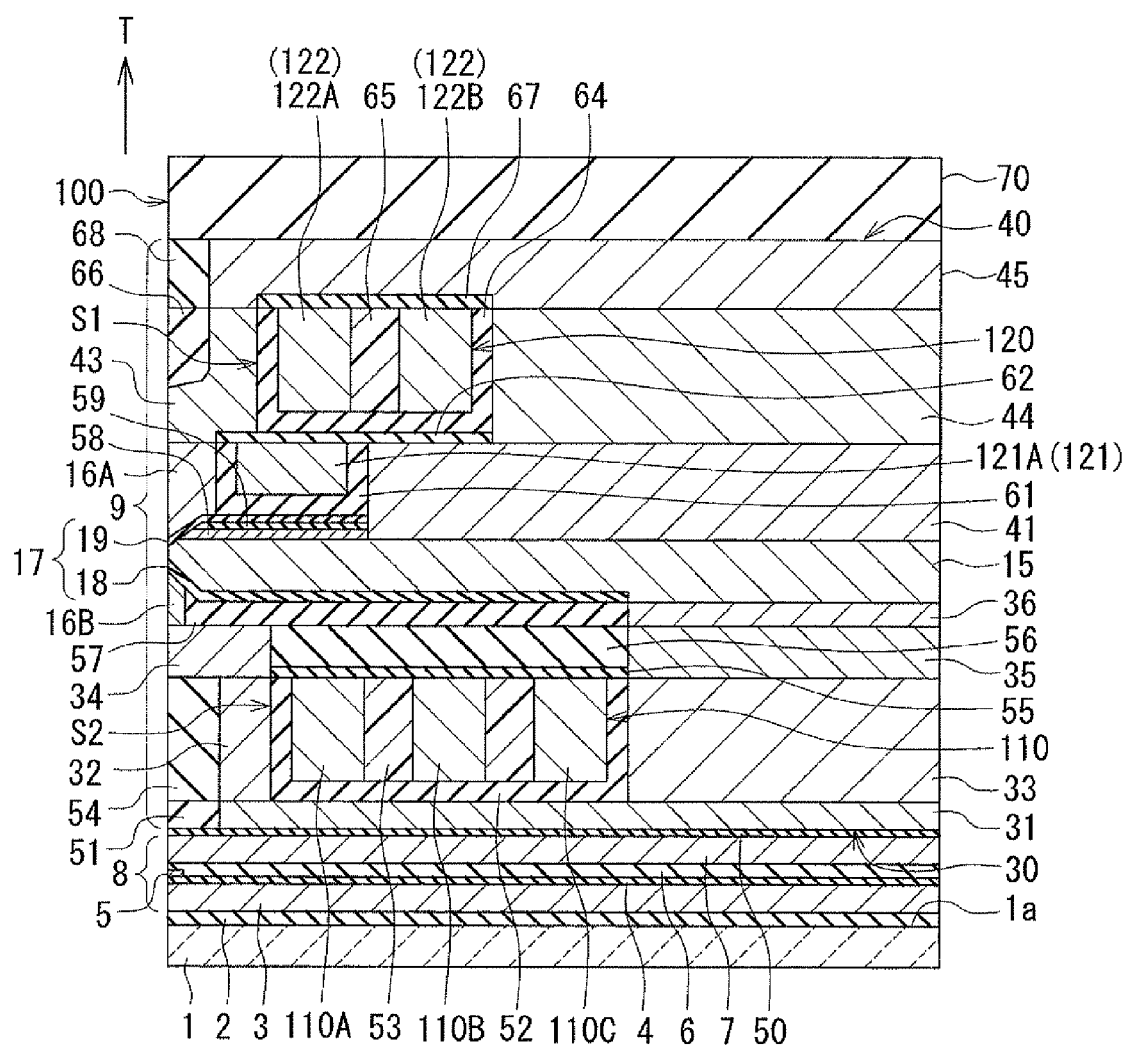
FIG. 16 is a cross-sectional view of a magnetic head according to a third embodiment of the invention.
Figure 17:
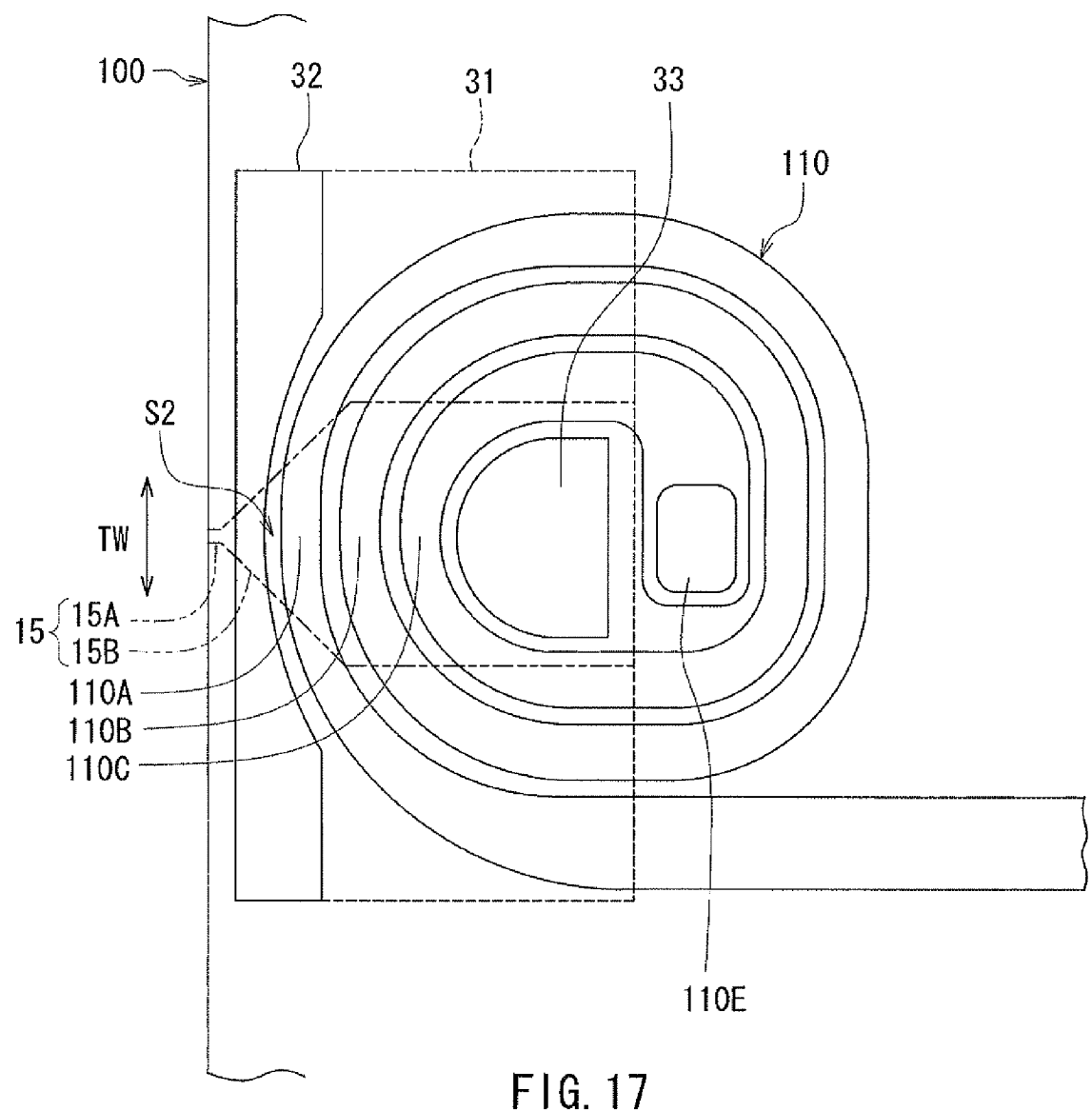
FIG. 17 is a plan view showing a second portion of a coil in the magnetic head according to the third embodiment of the invention.
Figure 18:
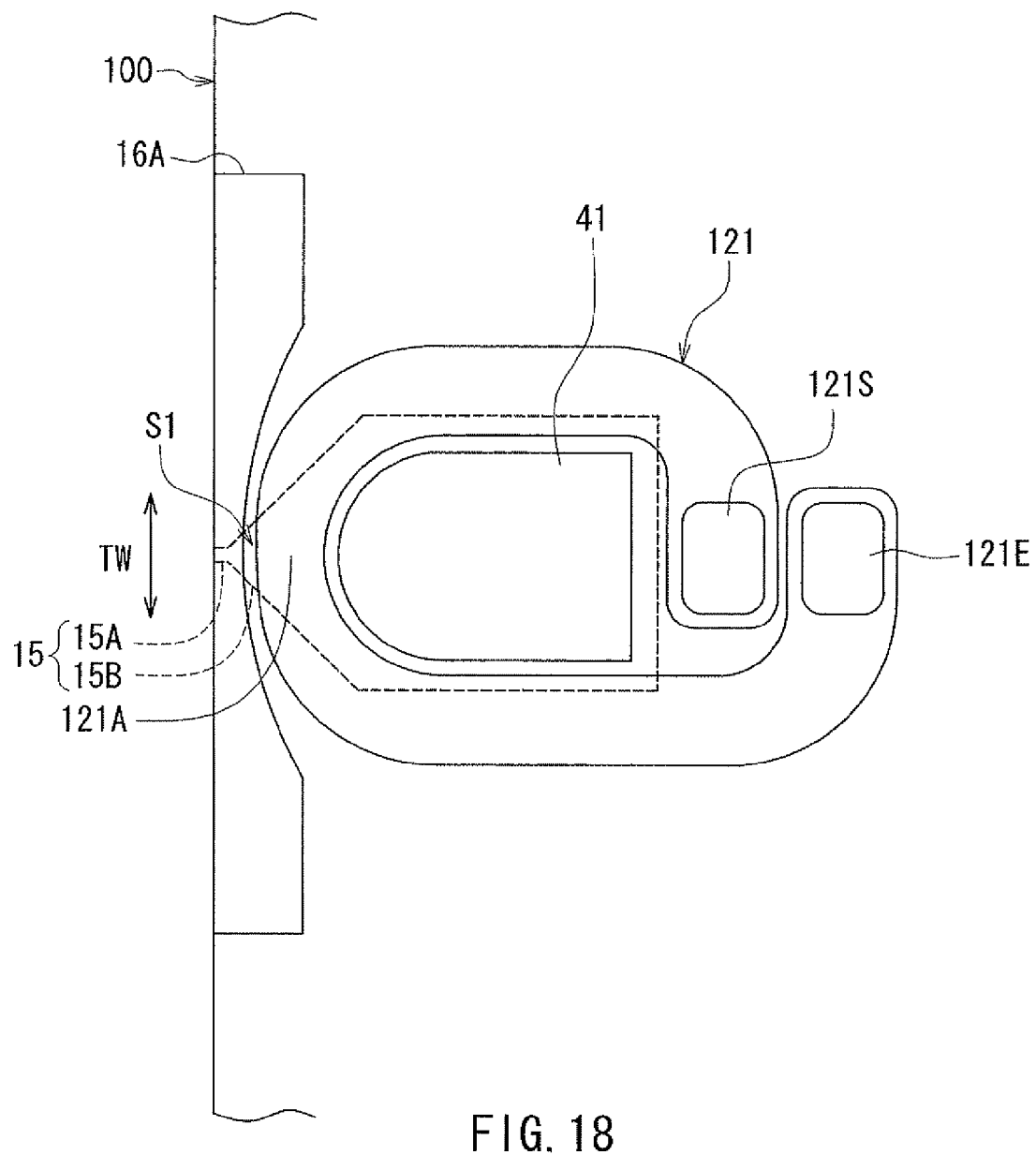
FIG. 18 is a plan view showing a first layer of a first portion of the coil in the magnetic head according to the third embodiment of the invention.
Figure 19:
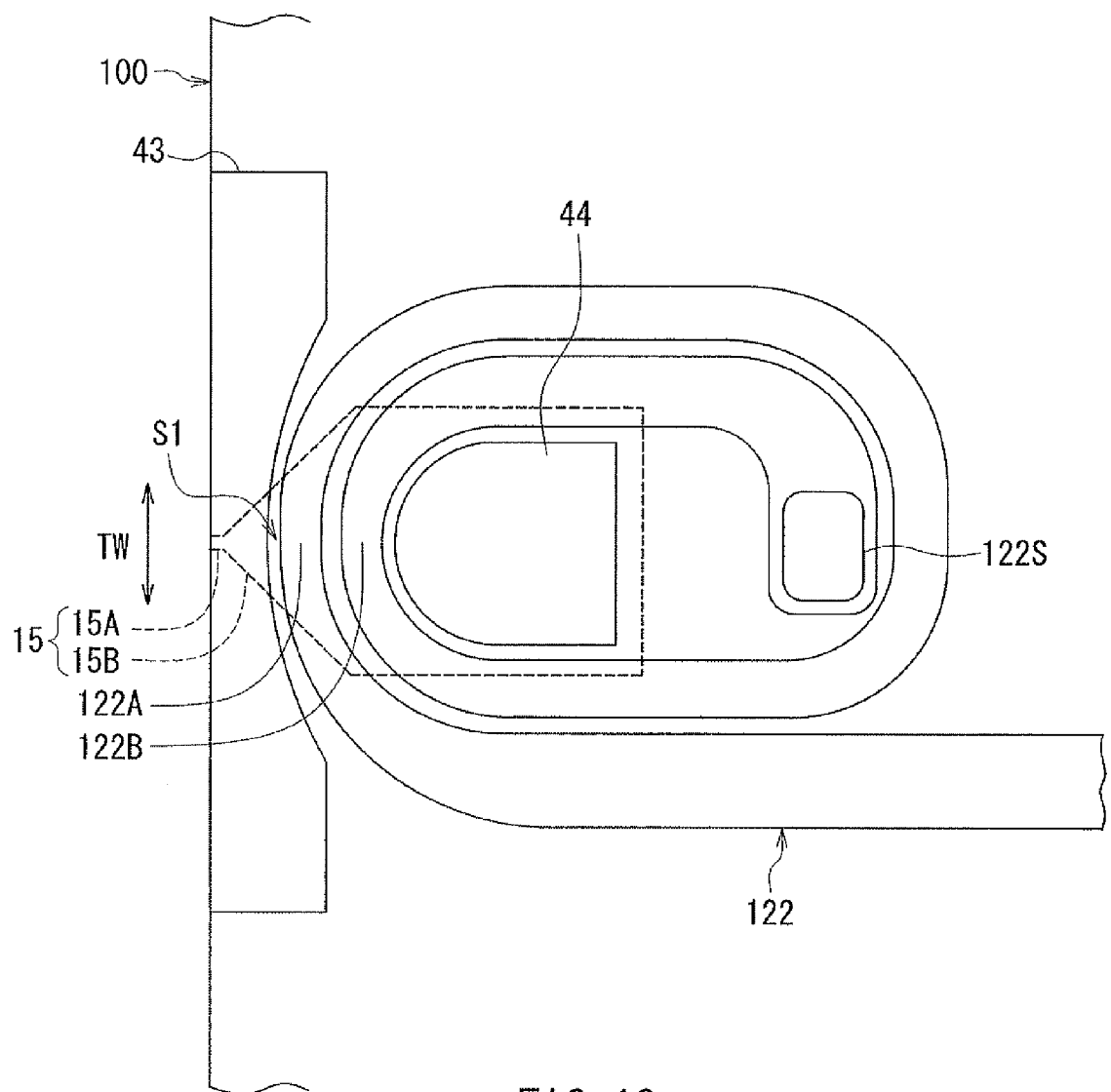
FIG. 19 is a plan view showing a second layer of the first portion of the coil in the magnetic head according to the third embodiment of the invention.

A magnetic head according to a third embodiment of the invention will now be described with reference to FIG. 16 to FIG. 19. FIG. 16 is a cross-sectional view of the magnetic head according to the present embodiment. Note that FIG. 16 shows a cross section perpendicular to the medium facing surface and the top surface of the substrate, or the main cross section, in particular. FIG. 17 is a plan view showing a second portion of the coil of the magnetic head according to the present embodiment. FIG. 18 is a plan view showing a first layer of a first portion of the coil of the magnetic head according to the present embodiment. FIG. 19 is a plan view showing a second layer of the first portion of the coil of the magnetic head according to the present embodiment.

The magnetic head according to the present embodiment is different from the magnetic head according to the first embodiment in the following respects. The coil of the present embodiment includes a first portion 120 and a second portion 110, instead of the first portion 20 and the second portion 10 of the first embodiment. As shown in FIG. 17, the second portion 110 is wound approximately three turns around the magnetic layer 33 which constitutes part of the second return path section 30.

In the magnetic head according to the present embodiment, neither of the magnetic layers 31 and 32 is exposed in the medium facing surface 100. The magnetic layers 31 and 32 have their respective end faces facing toward the medium facing surface 100. These end faces are located at a distance from the medium facing surface 100. The magnetic head according to the present embodiment has an insulating layer 51 made of an insulating material and disposed on the nonmagnetic layer 50 to surround the magnetic layer 31, and an insulating layer 54 made of an insulating material and surrounding the magnetic layer 32. Part of the insulating layer 51 is interposed between the medium facing surface 100 and the aforementioned end face of the magnetic layer 31. Part of the insulating layer 54 is interposed between the medium facing surface 100 and the aforementioned end face of the magnetic layer 32.

In the magnetic head according to the present embodiment, the second return path section 30 has magnetic layers 34, 35, and 36 in addition to the magnetic layers 31 to 33. The magnetic layer 34 is disposed on the magnetic layer 32 and the insulating layer 54. The magnetic layer 35 is disposed on the magnetic layer 33. The magnetic layer 36 is disposed on the magnetic layer 35. The magnetic layer 34 has an end face located in the medium facing surface 100. The magnetic head according to the present embodiment has an insulating layer 55 made of an insulating material and disposed over the top surfaces of the second portion 110, the insulating film 52 and the insulating layers 53 and 54, and an insulating layer 56 made of an insulating material and disposed on the insulating layer 55 to surround the magnetic layers 34 and 35. The top surfaces of the magnetic layers 34 and 35 and the insulating layer 56 are even with each other. The insulating layers 51 and 54 to 56 are made of alumina, for example.

In the magnetic head according to the present embodiment, the second shield 16B is disposed on the magnetic layer 34. The nonmagnetic layer 57 is disposed on part of the top surface of the magnetic layer 34 and on the top surface of the insulating layer 56, and surrounds the second shield 16B and the magnetic layer 36. The second gap layer 18 has an opening for exposing the top surface of the magnetic layer 36. The bottom end 15L of the main pole 15 is in contact with the top surface of the magnetic layer 36 at a position away from the medium facing surface 100.

The first portion 120 of the coil includes a first layer 121 and a second layer 122. As shown in FIG. 18, the shape and location of the first layer 121 are the same as those of the first layer 21 of the first embodiment. In the magnetic head according to the present embodiment, the insulating layer 62 is disposed over the top surfaces of the first layer 121 and the insulating film 61 and part of the top surface of the magnetic layer 41.

In the magnetic head according to the present embodiment, the first return path section 40 has magnetic layers 43, 44, and 45 instead of the magnetic layer 42 of the first embodiment. The magnetic layer 43 is disposed over the first shield 16A and the insulating layer 62. The magnetic layer 44 is disposed on the magnetic layer 41. The magnetic layer 43 has a front end face located in the medium facing surface 100, a top surface extending in a direction substantially perpendicular to the medium facing surface 100, and first and second connecting surfaces that connect the front end face and the top surface to each other. In the magnetic layer 43, an end of the first connecting surface is located in the medium facing surface 100, the other end of the first connecting surface is connected to an end of the second connecting surface, and the other end of the second connecting surface is connected to the top surface. The distance from the top surface 1a of the substrate 1 to an arbitrary point on the first connecting surface increases with increasing distance from the arbitrary point to the medium facing surface 100. The second connecting surface is parallel to the medium facing surface 100.

As shown in FIG. 19, the second layer 122 is wound approximately two turns around the magnetic layer 44 which constitutes part of the first return path section 40. The magnetic head according to the present embodiment is without the insulating film 63. Instead, the magnetic head according to the present embodiment has: an insulating film 64 made of an insulating material and interposed between the second layer 122 and each of the magnetic layers 43 and 44 and the insulating layer 62; an insulating layer 65 made of an insulating material and disposed in the space between adjacent turns of the second layer 122; and an insulating layer 66 made of an insulating material and disposed around the second layer 122 and the magnetic layer 43. Part of the insulating layer 66 is interposed between the medium facing surface 100 and the first and second connecting surfaces of the magnetic layer 43. The top surfaces of the second layer 122, the magnetic layers 43 and 44, the insulating film 64, and the insulating layers 65 and 66 are even with each other. The magnetic head according to the present embodiment further has an insulating layer 67 made of an insulating material and disposed over the top surfaces of the second layer 122 and the insulating film 64. The insulating film 64 and the insulating layers 66 and 67 are made of alumina, for example. The insulating layer 65 is made of photoresist, for example.

The magnetic layer 45 is disposed over the magnetic layers 43 and 44 and the insulating layer 67, and connects the magnetic layer 43 and the magnetic layer 44 to each other. The magnetic layer 45 has an end face facing toward the medium facing surface 100. This end face is located at a distance from the medium facing surface 100. The magnetic head according to the present embodiment has an insulating layer 68 made of an insulating material and disposed around the magnetic layer 45. Part of the insulating layer 68 is interposed between the medium facing surface 100 and the aforementioned end face of the magnetic layer 45. The insulating layer 68 is made of alumina, for example. The top surfaces of the magnetic layer 45 and the insulating layer 68 are even with each other.

Now, the first portion 120 and the second portion 110 of the coil will be described in more detail with reference to FIG. 17 to FIG. 19. As shown in FIG. 17, the second portion 110 includes three second coil elements 110A, 110B, and 110C extending to pass between the magnetic layer 32 and the magnetic layer 33, in particular, within the second space S2. The second coil elements 110A, 110B, and 110C align in this order in the direction perpendicular to the medium facing surface 100, the coil element 110A being closest to the medium facing surface 100. The second portion 110 has a coil connection part 110E electrically connected to the first portion 120.

As shown in FIG. 18, the first layer 121 of the first portion 120 includes a first coil element 121A extending to pass between the first shield 16A and the magnetic layer 41, in particular, within the first space S1. The first layer 121 has a coil connection part 121S electrically connected to the coil connection part 110E of the second portion 110, and a coil connection part 121E electrically connected to the second layer 122. The coil connection part 121S is electrically connected to the coil connection part 110E via a columnar connection layer (not shown) that penetrates a plurality of layers interposed between the first layer 121 and the second portion 110.

As shown in FIG. 19, the second layer 122 of the first portion 120 includes two first coil elements 122A and 122B extending to pass between the magnetic layer 43 and the magnetic layer 44, in particular, within the first space S1. The first coil elements 122A and 122B align in this order in the direction perpendicular to the medium facing surface 100, the coil element 122A being closer to the medium facing surface 100. The second layer 122 has a coil connection part 122S penetrating the insulating layer 62 and the insulating film 64 and electrically connected to the coil connection part 121E of the first layer 121. In the example shown in FIG. 17 to FIG. 19, the first portion 120 and the second portion 110 are connected in series.

In the present embodiment, the insulating layer 54 which is harder than the magnetic layer 32 is provided between the magnetic layer 32 and the medium facing surface 100. The insulating layer 54 exists over a larger area than does the magnetic layer 32. The insulating layer 54 therefore functions to prevent changes in the position of the magnetic layer 32 induced by heat that is generated by the second portion 110. Thus, the present embodiment makes it possible to prevent part of the medium facing surface 100 from protruding due to the heat generated by the second portion 110.

The coil of the present embodiment may be configured to be helically wound around the main pole 15 as in the second embodiment. The remainder of configuration, function and effects of the present embodiment are similar to those of the first or second embodiment.

Fourth Embodiment

Figure 20:
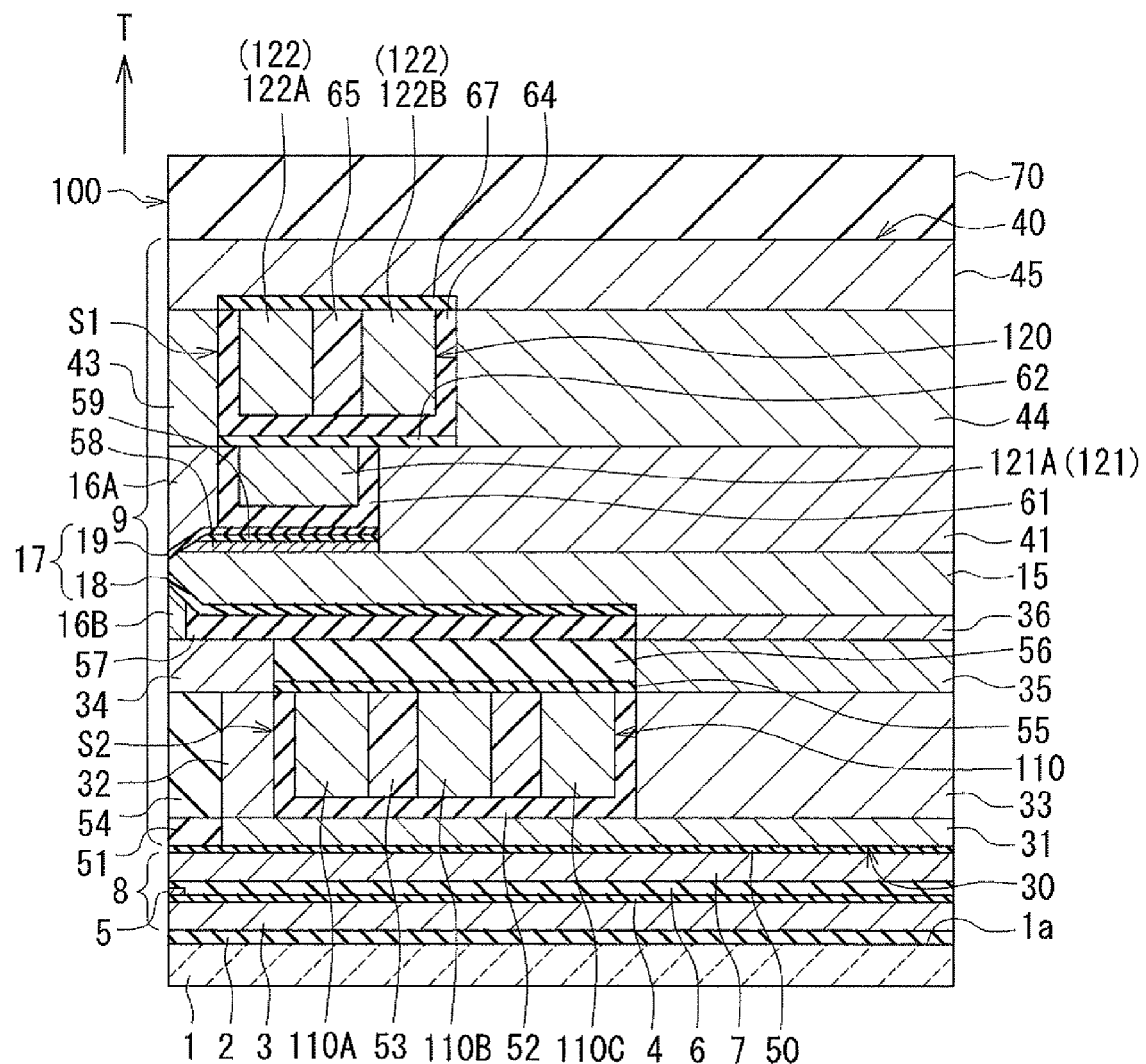
FIG. 20 is a cross-sectional view of a magnetic head according to a fourth embodiment of the invention.

A magnetic head according to a fourth embodiment of the invention will now be described with reference to FIG. 20. FIG. 20 is a cross-sectional view of the magnetic head according to the present embodiment. Note that FIG. 20 shows a cross section perpendicular to the medium facing surface and the top surface of the substrate, or the main cross section, in particular.

The magnetic head according to the present embodiment is different from the magnetic head according to the third embodiment in the following respects. In the magnetic head according to the present embodiment, the magnetic layer 43 does not have the first and second connecting surfaces. The top surface of the magnetic layer 43 extends to the medium facing surface 100 and is connected to the front end face of the magnetic layer 43. In the magnetic head according to the present embodiment, the magnetic layer 45 has an end face located in the medium facing surface 100.

The remainder of configuration, function and effects of the present embodiment are similar to those of the third embodiment.

Fifth Embodiment

Figure 21:
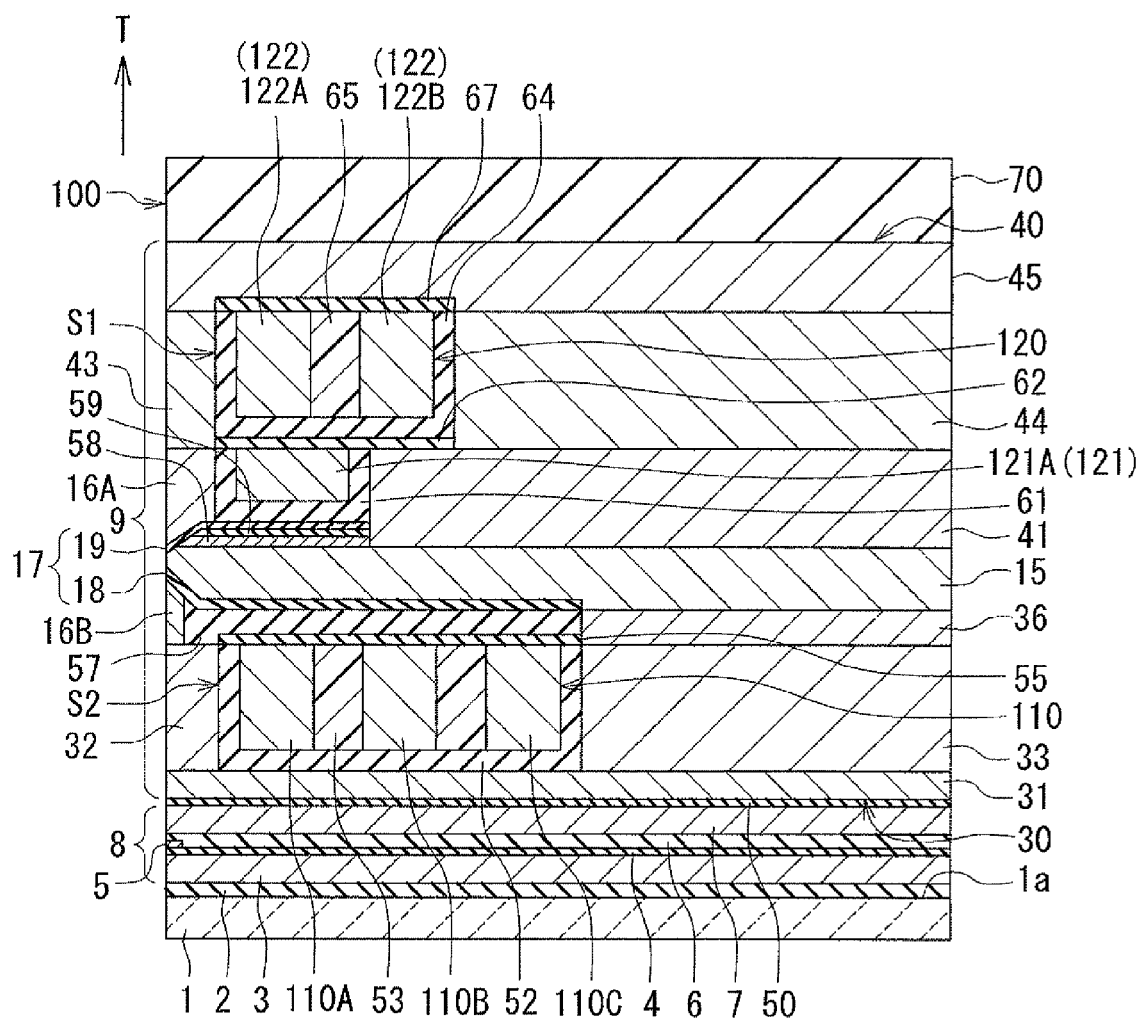
FIG. 21 is a cross-sectional view of a magnetic head according to a fifth embodiment of the invention.

A magnetic head according to a fifth embodiment of the invention will now be described with reference to FIG. 21. FIG. 21 is a cross-sectional view of the magnetic head according to the present embodiment. Note that FIG. 21 shows a cross section perpendicular to the medium facing surface and the top surface of the substrate, or the main cross section, in particular.

The magnetic head according to the present embodiment is different from the magnetic head according to the fourth embodiment in the following respects. In the magnetic head according to the present embodiment, each of the magnetic layers 31 and 32 has an end face located in the medium facing surface 100. The magnetic head according to the present embodiment does not have the magnetic layers 34 and 35 and the insulating layer 56. The second shield 16B is disposed on the magnetic layer 32. The magnetic layer 36 is disposed on the magnetic layer 33. The nonmagnetic layer 57 is disposed on part of the top surface of the magnetic layer 34 and the top surface of the insulating layer 55, and surrounds the second shield 16B and the magnetic layer 36.

The remainder of configuration, function and effects of the present embodiment are similar to those of the fourth embodiment.

Sixth Embodiment

Figure 22:
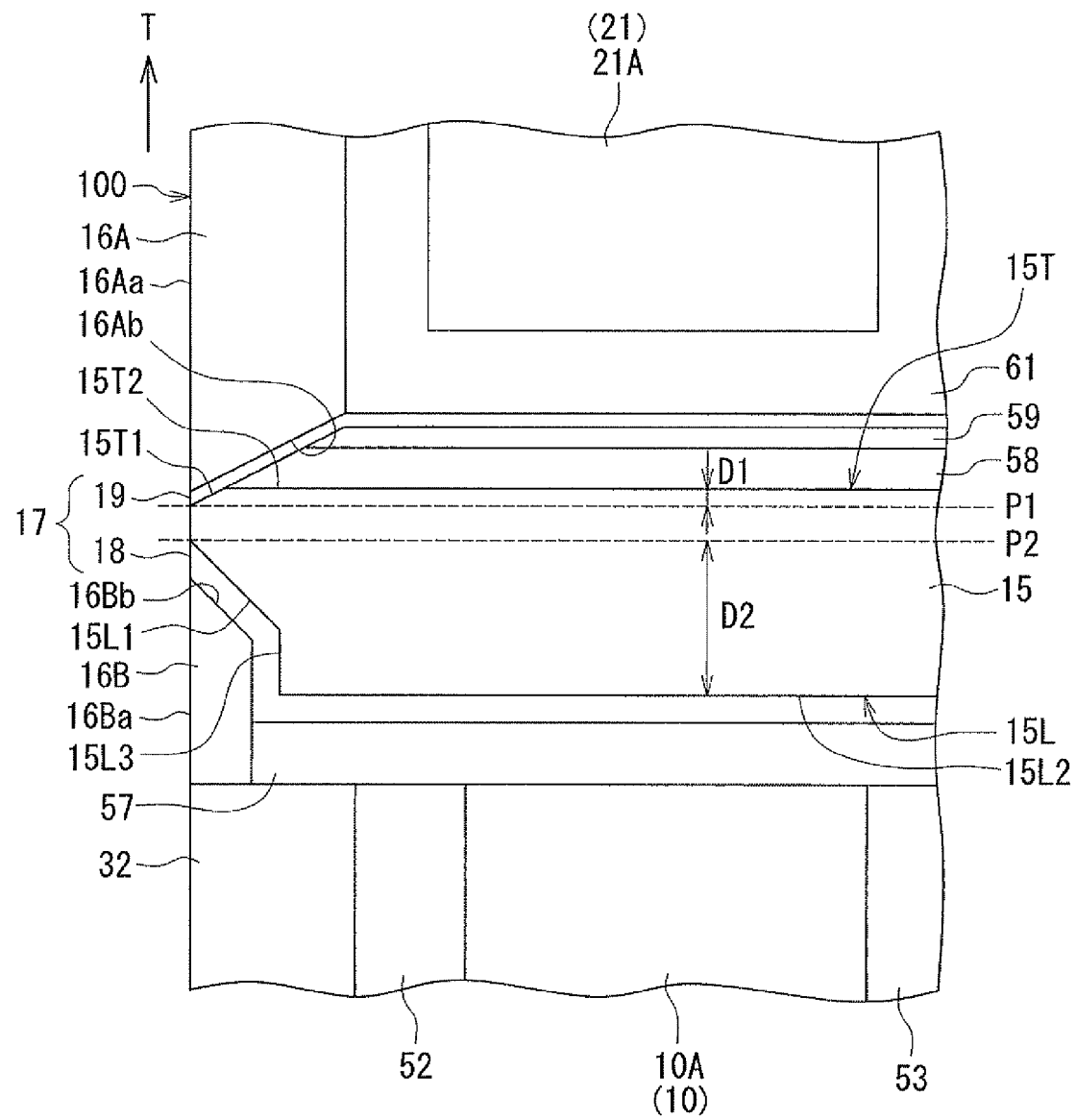
FIG. 22 is a cross-sectional view showing a part of the main pole in the vicinity of the medium facing surface in a magnetic head according to a sixth embodiment of the invention.

A magnetic head according to a sixth embodiment of the invention will now be described with reference to FIG. 22. FIG. 22 is a cross-sectional view showing a part of the main pole in the vicinity of the medium facing surface in the magnetic head according to the present embodiment. Note that FIG. 22 shows a cross section perpendicular to the medium facing surface and the top surface of the substrate, or the main cross section, in particular.

The magnetic head according to the present embodiment is different from the magnetic head according to the first embodiment in the following respects. The bottom end 15L of the main pole 15 of the present embodiment includes a coupling surface 15L3, in addition to the third portion 15L1 and the fourth portion 15L2 described in relation to the first embodiment. The coupling surface 15L3 is a plane that is parallel or almost parallel to the medium facing surface 100. The second end of the third portion 15L1 is connected to a top end of the coupling surface 15L3. The fourth portion 15L2 is connected to a bottom end of the coupling surface 15L3.

The present embodiment makes it possible to increase the distance D2 between the fourth portion 15L2 and the second virtual plane P2 as compared with a case where the coupling surface 15L3 is not provided. According to the present embodiment, it is thus possible to sufficiently increase the thickness of a portion of the main pole 15 that is located farther from the medium facing surface 100 than is the third portion 15L1, and to thereby provide improved write characteristics.

A method of manufacturing the magnetic head according to the present embodiment will now be described briefly. The method of manufacturing the magnetic head according to the present embodiment is basically the same as the method according to the first embodiment. In the present embodiment, however, the etching condition for the nonmagnetic layer 57 in the step of FIG. 9A and FIG. 9B is different from that in the first embodiment. In the present embodiment, the nonmagnetic layer 57 is etched by, for example, reactive ion etching, under such a condition that the nonmagnetic layer 57 is etched vertically to expose part of the side surface of the second shield 16B in the vicinity of the boundary between the nonmagnetic layer 57 as originally formed and the second shield 16B.

The configuration of the magnetic head according to the present embodiment except the main pole 15 may be the same as that of the magnetic head according to the second, third, fourth, or fifth embodiment. The remainder of configuration, function and effects of the present embodiment are similar to those of the first, second, third, fourth, or fifth embodiment.

Seventh Embodiment

Figure 23:
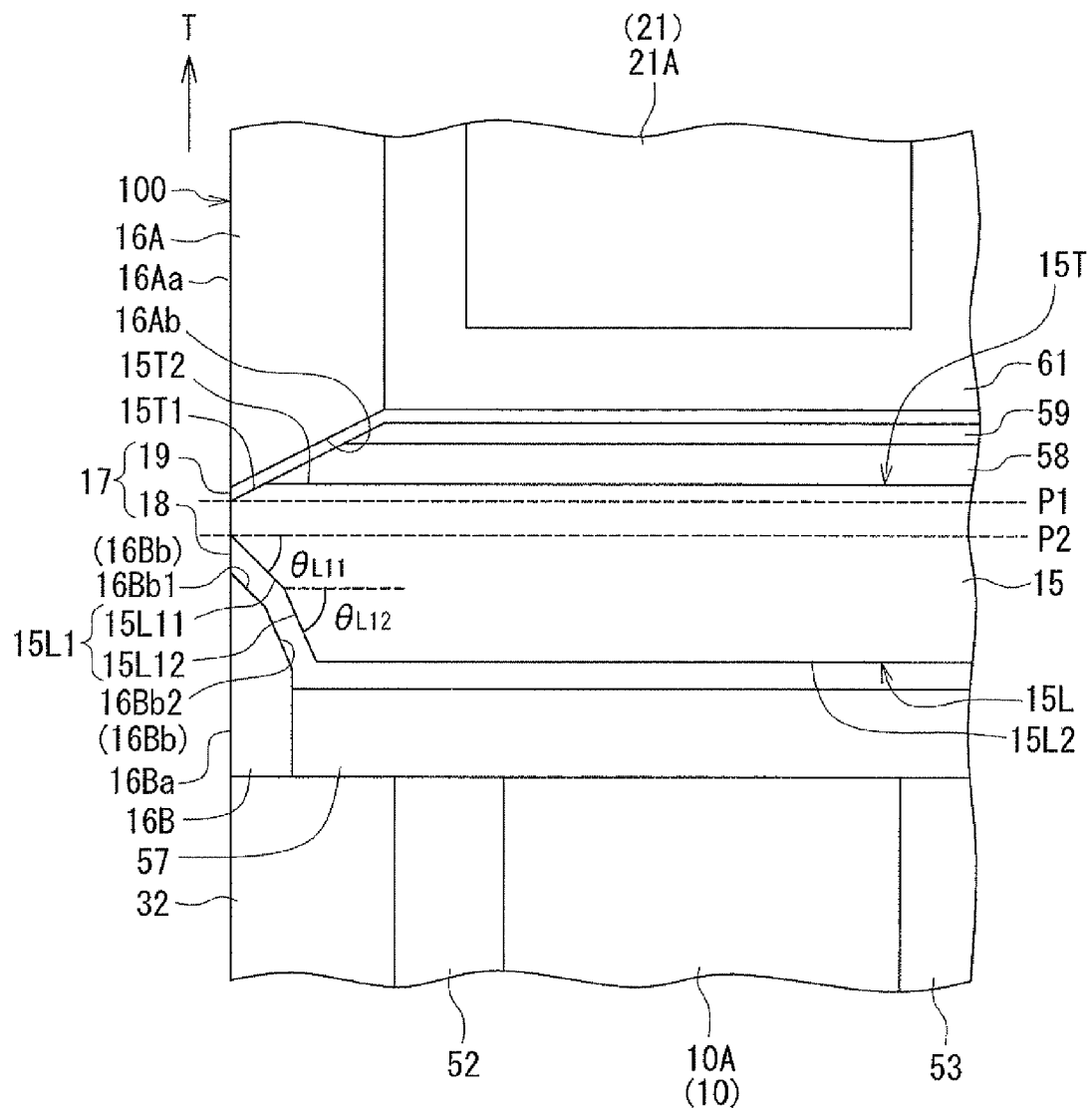
FIG. 23 is a cross-sectional view showing a part of the main pole in the vicinity of the medium facing surface in a magnetic head according to a seventh embodiment of the invention.

A magnetic head according to a seventh embodiment of the invention will now be described with reference to FIG. 23. FIG. 23 is a cross-sectional view showing a part of the main pole in the vicinity of the medium facing surface in the magnetic head according to the present embodiment. Note that FIG. 23 shows a cross section perpendicular to the medium facing surface and the top surface of the substrate, or the main cross section, in particular.

The magnetic head according to the present embodiment is different from the magnetic head according to the sixth embodiment in the following respects. The bottom end 15L of the main pole 15 of the present embodiment does not have the coupling surface 15L3. In the magnetic head according to the present embodiment, the third portion 15L1 includes two portions 15L11 and 15L12 continuous with each other and arranged in this order of increasing distance from the medium facing surface 100. The portion 15L11 has a first end located in the medium facing surface 100 and a second end opposite to the first end. The first end of the portion 15L11 also serves as the first end of the third portion 15L1. The portion 15L12 has a first end connected to the second end of the portion 15L11 and a second end opposite to the first end. The second end of the portion 15L12 also serves as the second end of the third portion 15L1. The fourth portion 15L2 is connected to the second end of the portion 15L12 (the second end of the third portion 15L1).

Here, as shown in FIG. 23, the angle of inclination of the portion 15L11 relative to the second virtual plane P2 will be represented by the symbol $\theta_{L11}$, and the angle of inclination of the portion 15L12 relative to a virtual plane that passes through the first end of the portion 15L12 and is perpendicular to the medium facing surface 100 and to the direction T of travel of the recording medium will be represented by the symbol $\theta_{L12}$. In the present embodiment, the angle of inclination $\theta_{L12}$ is greater than the angle of inclination $\theta_{L11}$. The angle of inclination $\theta_{L11}$ falls within the range of 30° to 50°, for example. The angle of inclination $\theta_{L12}$ falls within the range of 50° to 75°, for example.

The second slope 16Bb of the second shield 16B of the present embodiment includes a first surface 16Bb1 and a second surface 16Bb2. An end of the first surface 16Bb1 is located in the medium facing surface 100. The second surface 16Bb2 is continuous with the first surface 16Bb1 and is located farther from the medium facing surface 100 than is the first surface 16Bb1. The first surface 16Bb1 is opposed to the portion 15L11 with the second gap layer 18 interposed therebetween. The angle of inclination of the first surface 16Bb1 is equal or nearly equal to the angle of inclination $\theta_{L11}$ of the portion 15L11. The second surface 16Bb2 is opposed to the portion 15L12 with the second gap layer 18 interposed therebetween. The angle of inclination of the second surface 16Bb2 is equal or nearly equal to the angle of inclination $\theta_{L12}$ of the portion 15L12.

A method of manufacturing the magnetic head according to the present embodiment will now be described briefly. The method of manufacturing the magnetic head according to the present embodiment is basically the same as the method according to the sixth embodiment (the first embodiment). In the present embodiment, however, the etching condition for the second shield 16B in the step of FIG. 10A and FIG. 10B is different from that in the first embodiment. In the present embodiment, the second shield 16B is etched by, for example, ion beam etching, under such a condition that the second shield 16B is provided with the first and second surfaces 16Bb1 and 16Bb2.

The remainder of configuration, function and effects of the present embodiment are similar to those of the sixth embodiment.

Eighth Embodiment

Figure 24:
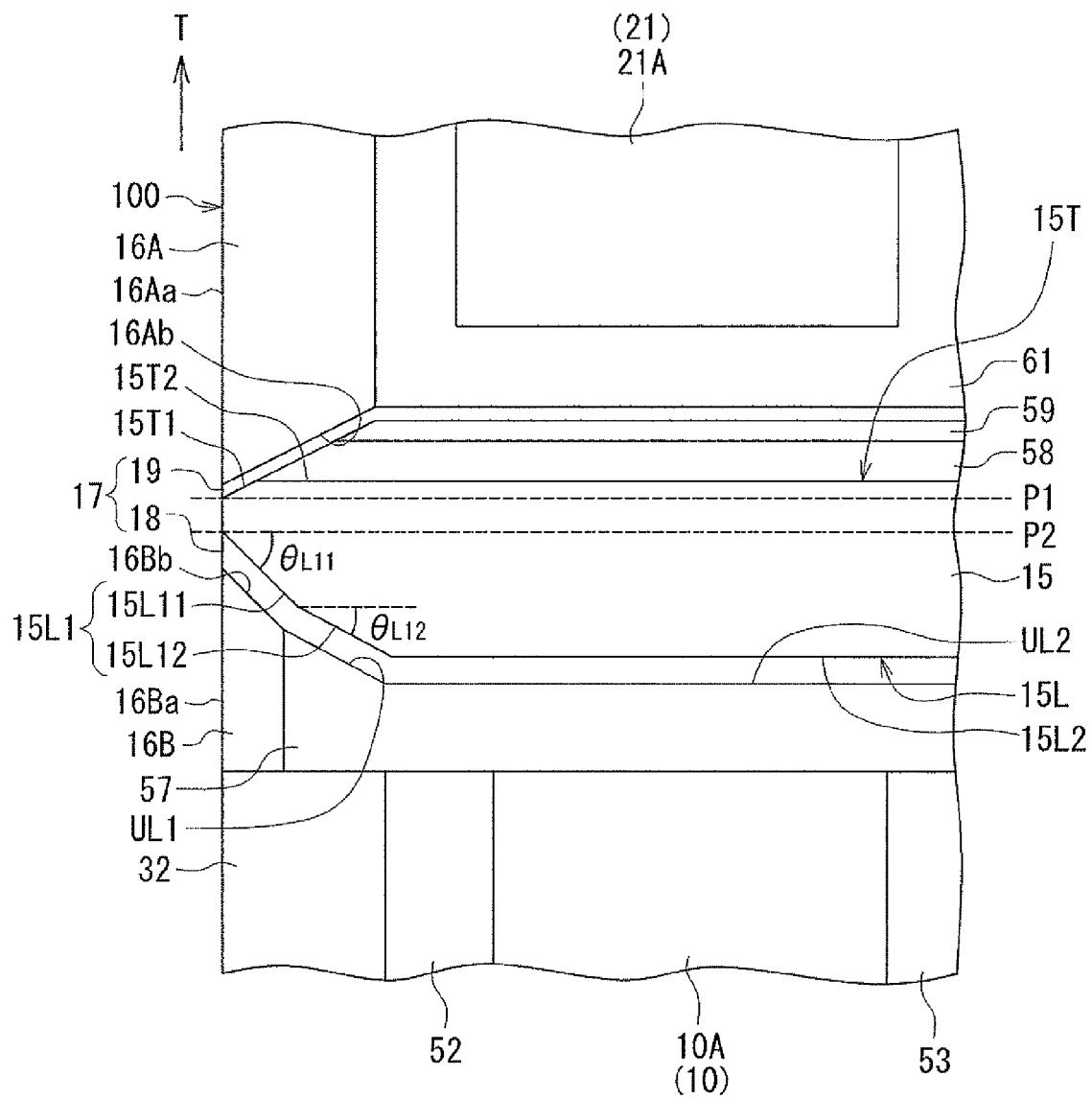
FIG. 24 is a cross-sectional view showing a part of the main pole in the vicinity of the medium facing surface in a magnetic head according to an eighth embodiment of the invention.

A magnetic head according to an eighth embodiment of the invention will now be described with reference to FIG. 24. FIG. 24 is a cross-sectional view showing a part of the main pole in the vicinity of the medium facing surface in the magnetic head according to the present embodiment. Note that FIG. 24 shows a cross section perpendicular to the medium facing surface and the top surface of the substrate, or the main cross section, in particular.

The magnetic head according to the present embodiment is different from the magnetic head according to the seventh embodiment in the following respects. In the magnetic head according to the present embodiment, the angle of inclination $\theta_{L12}$ of the portion 15L12 is smaller than the angle of inclination $\theta_{L11}$ of the portion 15L11. The angle of inclination $\theta_{L11}$ falls within the range of 30° to 50°, for example. The angle of inclination $\theta_{L12}$ falls within the range of 20° to 40°, for example.

In the present embodiment, the second slope 16Bb is opposed to the portion 15L11 with the second gap layer 18 interposed therebetween. The angle of inclination of the second slope 16Bb is equal or nearly equal to the angle of inclination $\theta_{L11}$ of the portion 15L11. The slope UL1 is opposed to the portion 15L12 with the second gap layer 18 interposed therebetween. The angle of inclination of the slope UL1 is equal or nearly equal to the angle of inclination $\theta_{L12}$ of the portion 15L12.

When the magnetic heads according to the first to seventh embodiments are used with a recording medium having a low coercivity, there is a possibility that the main pole 15 produces an excessive amount of magnetic flux to cause a reduction in the gradient of the write magnetic field or cause erroneous writing or erasure of data in the vicinity of the record bit targeted for writing in the recording medium. The magnetic head according to the present embodiment is suitable for use in such a case. More specifically, the present embodiment makes it possible to reduce the thickness of a portion of the main pole 15 that is located farther from the medium facing surface 100 than is the third portion 15L1, and instead, increase the volume of a portion of the main pole 15 in the vicinity of the boundary between the portion 15L11 and the portion 15L12, as compared with the magnetic heads according to the first to seventh embodiments. This enables the main pole 15 to produce an appropriately controlled amount of magnetic flux. The present embodiment also makes it possible for the third portion 15L1 to prevent magnetic flux leakage from inside to outside the main pole 15.

A method of manufacturing the magnetic head according to the present embodiment will now be described briefly. The method of manufacturing the magnetic head according to the present embodiment is basically the same as the method according to the first embodiment. However, the angle of inclination of the second slope 16Bb and that of the slope UL1 formed in the step of FIG. 10A and FIG. 10B of the first embodiment are different from each other.

The remainder of configuration, function and effects of the present embodiment are similar to those of the seventh embodiment.

Ninth Embodiment

Figure 25:
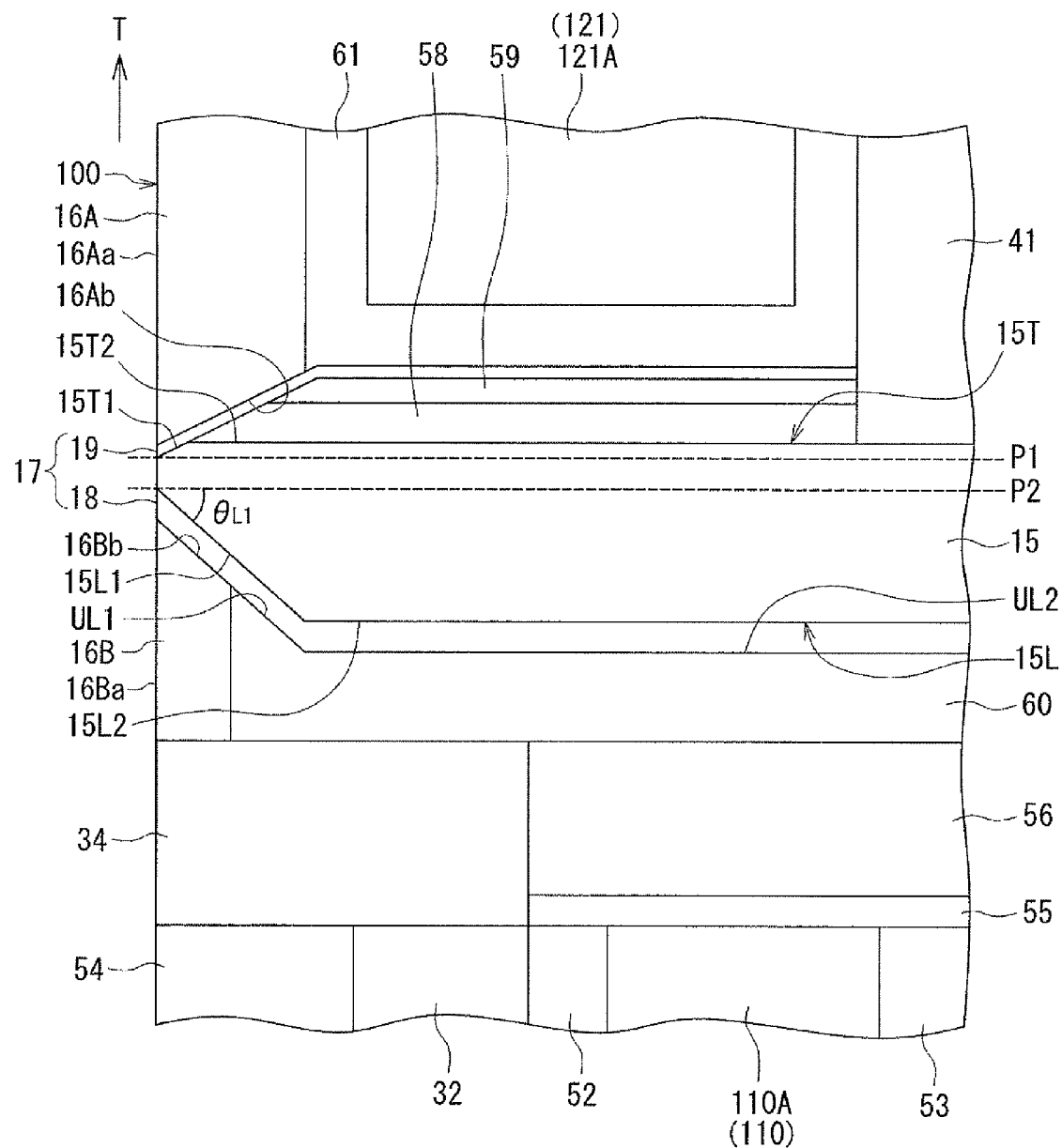
FIG. 25 is a cross-sectional view showing a part of the main pole in the vicinity of the medium facing surface in a magnetic head according to a ninth embodiment of the invention.

A magnetic head according to a ninth embodiment of the invention will now be described with reference to FIG. 25. FIG. 25 is a cross-sectional view showing a part of the main pole in the vicinity of the medium facing surface in the magnetic head according to the present embodiment. Note that FIG. 25 shows a cross section perpendicular to the medium facing surface and the top surface of the substrate, or the main cross section, in particular.

The magnetic head according to the present embodiment is different from the magnetic head according to the third embodiment in the following respects. The magnetic head according to the present embodiment has a nonmagnetic layer 60 made of a nonmagnetic material, instead of the nonmagnetic layer 57. The nonmagnetic layer 60 is made of a material having a Vickers hardness lower than that of alumina. In the present embodiment, since the nonmagnetic layer 60 is not in contact with the second portion 10 of the coil, the nonmagnetic material forming the nonmagnetic layer 60 can be an insulating material or a nonmagnetic metal material. $SiO_2$ is an example of insulating materials that can be used to form the nonmagnetic layer 60. Ru is an example of nonmagnetic metal materials that can be used to form the nonmagnetic layer 60.

A method of manufacturing the magnetic head according to the present embodiment will now be described briefly. The method of manufacturing the magnetic head according to the present embodiment is basically the same as the method according to the first embodiment. In the present embodiment, however, the first portion 120 and the second portion 110 of the coil that have been described in relation to the third embodiment are formed instead of the first portion 20 and the second portion 10 of the coil of the first embodiment. In the present embodiment, the magnetic layers 34 to 36, 43 to 45, the insulating layers 55, 56 and 65 to 68, and the insulating film 64 that have been described in relation to the third embodiment are formed instead of forming the magnetic layer 42 and the insulating film 63 of the first embodiment.

In the present embodiment, the nonmagnetic layer 60 is formed instead of the nonmagnetic layer 57 of the first embodiment. Now, a description will be given of a step that follows the formation of the nonmagnetic layer 60. In this step, ion beam etching, for example, is performed to etch simultaneously the nonmagnetic layer 60 and part of the top surface of the second shield 16B in the vicinity of the position ABS where the medium facing surface 100 is to be formed. This etching is performed so that the top surface of the second shield 16B is provided with the second slope 16Bb of the first embodiment shown in FIG. 10A. This etching is performed until the etched bottom of the nonmagnetic layer 60 reaches a level between the top and bottom surfaces of the nonmagnetic layer 60 as originally formed, so that the nonmagnetic layer 60 after being etched has the slope UL1 continuous with the second slope 16Bb. The angle of inclination of the slope UL1 formed by the nonmagnetic layer 60 is equal or nearly equal to the angle of inclination $\theta_{L1}$ of the third portion 15L1 of the bottom end 15L of the main pole 15 to be formed later.

In the present embodiment, the nonmagnetic layer 60 is formed of a material having a Vickers hardness lower than that of alumina. This makes it easier to etch the nonmagnetic layer 60 by, for example, ion beam etching, as compared with a case where a nonmagnetic layer made of alumina is provided instead of the nonmagnetic layer 60. As a result, it is possible to form the second slope 16Bb and the slope UL1 at the same time easily by simultaneously etching the nonmagnetic layer 60 and the second shield 16B by, for example, ion beam etching, as described above.

The configuration of the magnetic head according to the present embodiment except the main pole 15 may be the same as the configuration of the magnetic head according to the first, second, fourth, or fifth embodiment. The remainder of configuration, function and effects of the present embodiment are similar to those of the first, second, third, fourth, or fifth embodiment.

The present invention is not limited to the foregoing embodiments, and various modifications may be made thereto. For example, the magnetic head may be provided with either one of the first return path section 40 and the second return path section 30.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   a coil that produces a magnetic field corresponding to data to be written on the recording medium;

a main pole that has an end face located in the medium facing surface, allows a magnetic flux corresponding to the magnetic field produced by the coil to pass, and produces a write magnetic field for writing the data on the recording medium by means of a perpendicular magnetic recording system;

a write shield that is made of a magnetic material and has an end face located in the medium facing surface; and a gap part that is made of a nonmagnetic material and interposed between the main pole and the write shield, wherein:

the end face of the write shield includes a first end face portion that is located forward of the end face of the main pole in a direction of travel of the recording medium;

the main pole has a top surface, and a bottom end opposite to the top surface, the top surface being a surface located at a forward end in the direction of travel of the recording medium;

the top surface of the main pole includes a first portion and a second portion that are arranged in this order of increasing distance from the medium facing surface;

the first portion has a first end located in the medium facing surface, and a second end opposite to the first end;

the bottom end of the main pole includes a third portion and a fourth portion that are arranged in this order of increasing distance from the medium facing surface;

the third portion has a first end located in the medium facing surface, and a second end opposite to the first end;

assuming a first virtual plane and a second virtual plane, the first virtual plane passing through the first end of the first portion and being perpendicular to the medium facing surface and to the direction of travel of the recording medium, the second virtual plane passing through the first end of the third portion and being perpendicular to the medium facing surface and to the direction of travel of the recording medium, the first portion is inclined relative to the first virtual plane and the medium facing surface such that the second end of the first portion is located forward of the first virtual plane in the direction of travel of the recording medium, while the third portion is inclined relative to the second virtual plane and the medium facing surface such that the second end of the third portion is located backward of the second virtual plane in the direction of travel of the recording medium;

the second portion and the fourth portion extend in a direction substantially perpendicular to the medium facing surface;

the write shield has a first slope including a portion that is opposed to the first portion with the gap part interposed therebetween, the first slope being inclined relative to the first virtual plane and the medium facing surface;

a distance between the fourth portion and the second virtual plane is greater than that between the second portion and the first virtual plane; and the first portion is smaller than each of the third portion and the first slope in length in a direction perpendicular to the medium facing surface.

2. The magnetic head for perpendicular magnetic recording according to claim 1, wherein:

the write shield has a second slope that is opposed to the third portion with the gap part interposed therebetween, the second slope being inclined relative to the second virtual plane and the medium facing surface; and the second slope is smaller than the third portion in length in the direction perpendicular to the medium facing surface.

3. The magnetic head for perpendicular magnetic recording according to claim 2, wherein:

the write shield includes a first shield that is located forward of the main pole in the direction of travel of the recording medium, and a second shield that is located backward of the main pole in the direction of travel of the recording medium;

the first shield includes the first end face portion and the first slope; and the second shield includes a second end face portion and the second slope, the second end face portion being located backward of the end face of the main pole in the direction of travel of the recording medium, the magnetic head further comprising a nonmagnetic layer disposed around the second shield, wherein the nonmagnetic layer includes a slope that is continuous with the second slope and inclined relative to the second virtual plane and the medium facing surface, and the third portion is opposed to the slope of the nonmagnetic layer and the second slope with the gap part interposed between the third portion and each of the slope of the nonmagnetic layer and the second slope.

4. The magnetic head for perpendicular magnetic recording according to claim 3, wherein the nonmagnetic layer is formed of a material having a Vickers hardness lower than that of alumina.

5. The magnetic head for perpendicular magnetic recording according to claim 1, wherein the end face of the main pole located in the medium facing surface has a width that decreases with increasing proximity to the second virtual plane.

6. The magnetic head for perpendicular magnetic recording according to claim 1, wherein the end face of the write shield further includes a second, a third, and a fourth end face portion, the second end face portion being located backward of the end face of the main pole in the direction of travel of the recording medium, the third and fourth end face portions being located on opposite sides of the end face of the main pole in a track width direction.

7. The magnetic head for perpendicular magnetic recording according to claim 6, further comprising a first return path section and a second return path section each made of a magnetic material, wherein:

the first return path section is located forward of the main pole in the direction of travel of the recording medium and connects the write shield and part of the main pole away from the medium facing surface to each other so that a first space is defined by the main pole, the gap part, the write shield, and the first return path section;

the second return path section is located backward of the main pole in the direction of travel of the recording medium and connects the write shield and part of the main pole away from the medium facing surface to each other so that a second space is defined by the main pole, the gap part, the write shield, and the second return path section; and the coil includes a first portion passing through the first space and a second portion passing through the second space.

* * * * *